(12) United States Patent
Fidrich et al.

(10) Patent No.: US 8,355,553 B2
(45) Date of Patent: Jan. 15, 2013

(54) SYSTEMS, APPARATUS AND PROCESSES FOR AUTOMATED MEDICAL IMAGE SEGMENTATION USING A STATISTICAL MODEL

(75) Inventors: Márta Fidrich, Szeged (HU); Laszlo Rusko, Szolnok (HU); György Bekes, Szeged (HU)

(73) Assignee: General Electric Company, Schenectady, NY (US)

( * ) Notice: Subject to any disclaimer, the term of this patent is extended or adjusted under 35 U.S.C. 154(b) by 1089 days.

(21) Appl. No.: 12/276,310

(22) Filed: Nov. 22, 2008

(65) Prior Publication Data

US 2010/0128946 A1    May 27, 2010

(51) Int. Cl.
    *A61B 6/03* (2006.01)
(52) U.S. Cl. ...................................................... 382/131
(58) Field of Classification Search .......... 382/128–134; 345/424
    See application file for complete search history.

(56) References Cited

FOREIGN PATENT DOCUMENTS

WO    WO 03/023717 A2    3/2003

OTHER PUBLICATIONS

Saddi et al., Region-Based Segmentation via Non-Rigid Template Matches, Oct. 2007, IEEE 11th International Conference on Computer Vision 2007, ICCV 2007, pp. 1-7.*
Lange et al., Recent Results in Cancer Research 167, edited by Schlag et al., Chapter 2, Development of Navigational Systems for Image-Guided Laparoscopic Tumor Resections in Liver Surgery, 2006, Springer-Verlag, ISBN 0080-0015, Cover, index, chapter 2, 31 pages total.*
Krahnstover et al., Development of a point based shape representation of arbitrary three-dimensional medical objects suitable for statistical modeling, 1999, SPIE vol. 3661, pp. 620-631.*
Bailleul et al., Segmentation of Anatomical Structures from 3D Brain MRI using Automatically-Built Statistical shape Models, 2004, International Conference on Image Processing (ICIP), p. 2741-2744.*
E.V. Rikxoort et al., "Automatic segmentation of the liver in computed tomography scans with voxel classification", Proc. MICCAI 2007, pp. 102-108, Springer-Verlag Berlin.
D. Furukawa et al., "Automatic Liver Segmentation Method based on Maximum a Posterior Probability Estimation", Proc. MICCAI 2007, pp. 117-124, Springer-Verlag Berlin.

(Continued)

*Primary Examiner* — Toan Ton
*Assistant Examiner* — John Corbett
(74) *Attorney, Agent, or Firm* — The Small Patent Law Group; Dean D. Small

(57) ABSTRACT

A system and process for analyzing multidimensional data characterizing a least a portion of a subject is described. An input module accepts at least one multidimensional dataset which is derived from any of several types of data sources. A registration module accepts the dataset from the input module and registers the dataset from the input module to a selected anatomical model to provide a registered dataset. A processing module is coupled to the registration module and uses this in determining a core region and associated core region information, and computes threshold characteristics of the registered dataset. A segmentation module accepts the registered dataset and the core region information from the processing module, and segments the registered dataset to provide a segmented description of an organ from the registered dataset and core region information, where the segmented, registered dataset describes characteristics of the organ of the subject.

20 Claims, 8 Drawing Sheets

OTHER PUBLICATIONS

D. Seghers et al., "Landmark based liver segmentation using local shape and local intensity models", Proc. MICCAI 2007, pp. 135-142, Springer-Verlag Berlin.

L. Rusko et al., "Fully automatic liver segmentation for contrast-enhanced CT images", Proc. MICCAI 2007, pp. 143-150, Springer-Verlag Berlin.

Heimann et al., "A Statistical Deformable Model for the Segmentation of Liver CT Volumes" MICCAI 2007, pp. 161-166, Springer-Verlag Berlin.

F. Ding et al. "Segmentation of 3D CT Volume Images Using a Single 2D Atlas", Lecture Notes in Computer Science, 2005, pp. 459-468.

S.W. Farraher et al., "Liver and spleen volumetry with quantitative MR imaging and dual-space clustering segmentation", Radiology vol. 237(1), 2005, pp. 322-328.

L. Hermoye et al., 'Liver segmentation in living liver transplant donors: Comparison of semiautomatic and manual methods', Radiology vol. 234, 2005, pp. 171-178.

H. Lamecker et al., "Segmentation of the Liver using a 3D Statistical Shape Model", Konrad-Zuse-Zentrum für Informationstechnik Berlin, ZIB-Report 04-09, 2004.

H. Li et al., "An improved image segmentation approach based on level set and mathematical morphology", Proc. SPIE, vol. 5286, 2003, pp. 851-854.

\* cited by examiner

SYSTEMS, APPARATUS AND PROCESSES FOR AUTOMATED MEDICAL IMAGE SEGMENTATION USING A STATISTICAL MODEL

FIELD OF THE DISCLOSURE

This disclosure relates generally to anatomical data processing technology, and in particular to systems, apparatus and processes for accurately, rapidly, efficiently and robustly segmenting anatomical data from any of a variety of imaging tools via a flexible, automated content-enhancement tool.

BACKGROUND

Many medical diagnostic, surgical and interventional procedures rely on imaging tools to provide information descriptive of status of visually perceived representations of portions or organs of a patient. In part as a result of increasing sophistication of medical tools in general, and imaging apparatus in particular, more types of imaging devices are being adapted for application in the context of surgical procedures.

In many instances, medical tools capable of rendering images of organs or tissues have found great utility and have been adapted to facilitate diagnostic procedures, surgery, living donor organ transplantation or other medical treatment. These imaging and characterization tools find application in many situations, and are very useful in situations where the surgeon cannot directly see the operating site, or when the features of interest are not amenable to direct visual inspection, or to enable comparison of a present image with other image data, among other instances. These applications have resulted in development of a broad variety of tools, including x-ray, computed axial tomography (also known as "CAT" or "CT" scanning), also known as body section röntgenography, fluoroscopic visualizing aids, magnetic resonance imaging apparatus and techniques, ultrasonic methods and devices, and many different types of optical imaging devices.

In the early 1900s, an Italian radiologist, Alessandro Vallebona, proposed a simple method of imaging a hypothetical "slice" taken through the body. This method used an X-ray tube that was coupled to a suitable film holder via a rigid support that was configured so that the X-ray tube and film holder rotated about a pivot point, which is the focus, while maintaining a fixed separation. As a result, images of anatomical features in the focal plane appear sharper in the developed film, with images of other points generally annihilating and averaging out to produce noise. More sophisticated techniques involving more complex motions were subsequently developed that provide more effective blurring of image data that is not desired and thus provide more precise images of desired portions of a patient.

In the 1970s, Godfrey Hounsfield and Allan McLeod Cormack, working at different institutions (and in different countries) coupled minicomputers to X-ray detectors to realize digital computed axial tomography. Nuclear magnetic resonance imaging, generally referred to as magnetic resonance imaging (to avoid poor publicity caused by ignorant association of the term "nuclear" with radioactivity and the dangers which radioactivity can pose for living tissue), was first performed on humans in 1977, and, consequently, has a significantly shorter history than various X-ray technologies.

In part due to the tremendous amount of development of X-ray equipment compared to that for hardware associated with MRI technologies, CT systems have advantages of leveraging a more mature manufacturing technology and manufacturing infrastructure, as well as a broader range of automated assessment tools, than is the case for MRI techniques. Consequently, widespread adoption of X-ray equipment, and the greater applicability of X-ray measurements for a broader range of medical (and other non-destructive) measurements, cause MRI systems to lag in terms of overall world market for CT systems. The unique imaging properties of MRI machines are not presently realized to the extent possible, at least in part because MRI technology lacks the base of computer-aided tools that have been developed for CT scanners.

While CT and MRI systems have many areas of overlap as far as imaging applications are concerned, MRI present significant advantages in some situations, particularly those requiring differentiation between various soft tissues. As a result, a medical facility will often budget first for X-ray and CT equipment, and will only be able to justify the costs of a MRI system when serving a larger population base. Consequently, there are fewer automated tools available for processing of MRI data, and that, coupled with the manufacturing and cost advantages enjoyed by the more mature CT hardware and software industries, lead to a relative dearth of operable MRI systems worldwide, and results in under-utilization of the benefits offered by MRI imaging devices.

The advent of digital imaging technologies resulted in a large number of new medical applications and usages for imaging tools. Initially, two-dimensional images were formed using recording media, and, subsequently, via optoelectronic display of picture elements or pixels. Those images then were analyzed by experts, initially via manual techniques specific to the imaging technology being employed.

However, more sophisticated techniques evolved capable of realizing datasets of volume-descriptive data comprising aggregations of unit cells, known as voxels. A rich variety of different techniques for employing such voxels to provide information have followed that evolution, coupled with a desire for ability to employ progressively lower radiation doses in order to be able to form detailed anatomical descriptions.

Imaging of soft tissues, in particular, presents challenges in developing high contrast between normal tissue and various types of pathologies. Those challenges, as well as the techniques and modalities which have been developed to address them, tend to be highly specific to the imaging technology being employed.

Segmentation of data, such as images, representing the measured characteristics of internal organs is necessary for a number of different medical applications, including surgery planning, radiotherapy planning and numerous other fields of use. Segmentation by hand of images of soft tissue can present labor-intensive aspects and also requires a high degree of training. As a result, development of automated techniques for processing of such data is presently a very active area of research, and much time and expense has been and is being devoted to this topic. However, many of the tools developed for these individual tasks are highly specific, for example, specific to a particular organ, or modality specific, and also frequently require user interaction. As well, they tend to require significant amounts of computer time. Also, these computer-aided procedures often cannot function without input provided by highly-trained personnel. Expertise in interpretation of information from these computer-based aids, and guidance of such computer-aided diagnostic or characterization processes tend to be specific to particular types of images, and the nature of the data varies considerably from one imaging technology or modality to another. In particular, contrast ratios tend to differ, such that a signature characteristic of a particular anatomical feature that is employed in recognition of specific anatomical portions using one imaging modality may not be represented adequately by another imaging technology to permit such recognition, at least via identification of the same or substantially similar aspects or characteristics of the imaging data.

Even with the benefit of tools that aid in automated processing of some kinds of anatomical data, there are numerous instances where those analysis aids encounter difficulty. For example, when parenchyma of an organ being studied provide data that is substantially similar (in visual texture, contrast, etc.) to data from surrounding organs, automated characterization instruments may have difficulty distinguishing one from the other. Similarly, when a large tumor mass causes a significant portion of the data for the organ of interest to deviate from the characteristics applicable to the organ and which form underlying assumptions regarding pixels or voxels to be included in forming an image of a portion of the subject organ, automated approaches may not be capable of unambiguously and robustly segmenting the subject organ. In all such instances, human intervention may be necessary in order to try to derive accurate and appropriate results.

For the reasons stated above, and for other reasons discussed below, which will become apparent to those skilled in the art upon reading and understanding the present disclosure, there are needs in the art to provide more highly automated image computation engines, and more generally-applicable protocols for application and usage of such capabilities. In particular, there is great need to develop automated data processing tools intended to streamline automated gathering and analysis of information from MRI machines and more particularly which are capable of handling data from a variety of distinct types of measurement apparatus in support of increasingly stringent and exacting performance and economic standards in settings such as medical imaging.

BRIEF DESCRIPTION

The above-mentioned shortcomings, disadvantages and problems are addressed herein, which will be understood by reading and studying the following disclosure.

In one aspect, a system for analyzing multidimensional data, where the data characterizes a least a portion of a subject, is described. The system includes an input module able to accept a dataset comprising at least one multidimensional dataset, where the dataset may be derived from any of several types of data sources. Also, the system incorporates a registration module coupled to the input module and capable of accepting the dataset from the input module. The registration module is able to register the dataset from the input module to a selected anatomical model to provide a registered dataset. The system further includes a processing module coupled to the registration module and capable of accepting the registered dataset from the registration module. The processing module uses this in determining a core region within the registered dataset and associated core region information, and, using the core region information and the registered dataset, computes threshold characteristics of the registered dataset. The system additionally includes a segmentation module coupled to the processing module and capable of accepting the registered dataset and the core region information from the processing module. The segmentation module segments the registered dataset to provide a segmented description of an organ from the registered dataset and core region information, where the segmented, registered dataset describes characteristics of the organ of the subject.

In another aspect, the present disclosure describes a model for an organ including multiple anatomical regions, with each anatomical region having an associated statistical data zone.

In a yet further aspect, the present disclosure also describes and teaches a process for segmenting multidimensional data representing a measurement of an internal portion of a subject. The process includes an act of inputting a dataset via an input module. The dataset comprises at least one multidimensional dataset, where the dataset may be derived from any of several types of data sources. The process also includes acts of registering data from the input module to a selected anatomical model to provide a registered dataset, processing the registered dataset, determining a core region within the registered dataset and determining associated core region statistical information, and then using the core region statistical information and the registered dataset in computing threshold characteristics of the registered dataset and segmenting the registered dataset using the core region statistical information to provide a segmented description of an organ from the registered dataset and core region information. The segmented, registered dataset describes characteristics of the organ of the subject.

In a further aspect, the present disclosure teaches an article of manufacture comprising a computer-readable medium having computer-readable code embodied thereon. The computer-readable code includes computer-readable instructions, which, when executed by one or more processors, causes the one or more processors to perform acts including inputting at least one multidimensional dataset. The dataset may be derived from any of several types of data sources. The computer-readable instructions also, when executed by one or more processors, cause the one or more processors to perform acts of registering at least a portion of data of the dataset from the input module to a selected anatomical model to provide a registered dataset, processing the registered dataset and determining a core region within the registered dataset, computing associated core region statistical information, calculating statistical characteristics of the registered dataset using the core region statistical information and the registered dataset and then segmenting the registered dataset using the core region statistical information to provide a segmented description of an organ from the registered dataset and core region statistical information. The segmented, registered dataset describes characteristics of the organ of the subject.

Systems, processes, and computer-readable media of varying scope are described herein. In addition to the aspects and advantages described in this summary, further aspects and advantages will become apparent by reference to the drawings and by reading the following detailed description.

DETAILED DESCRIPTION

Figure 1:
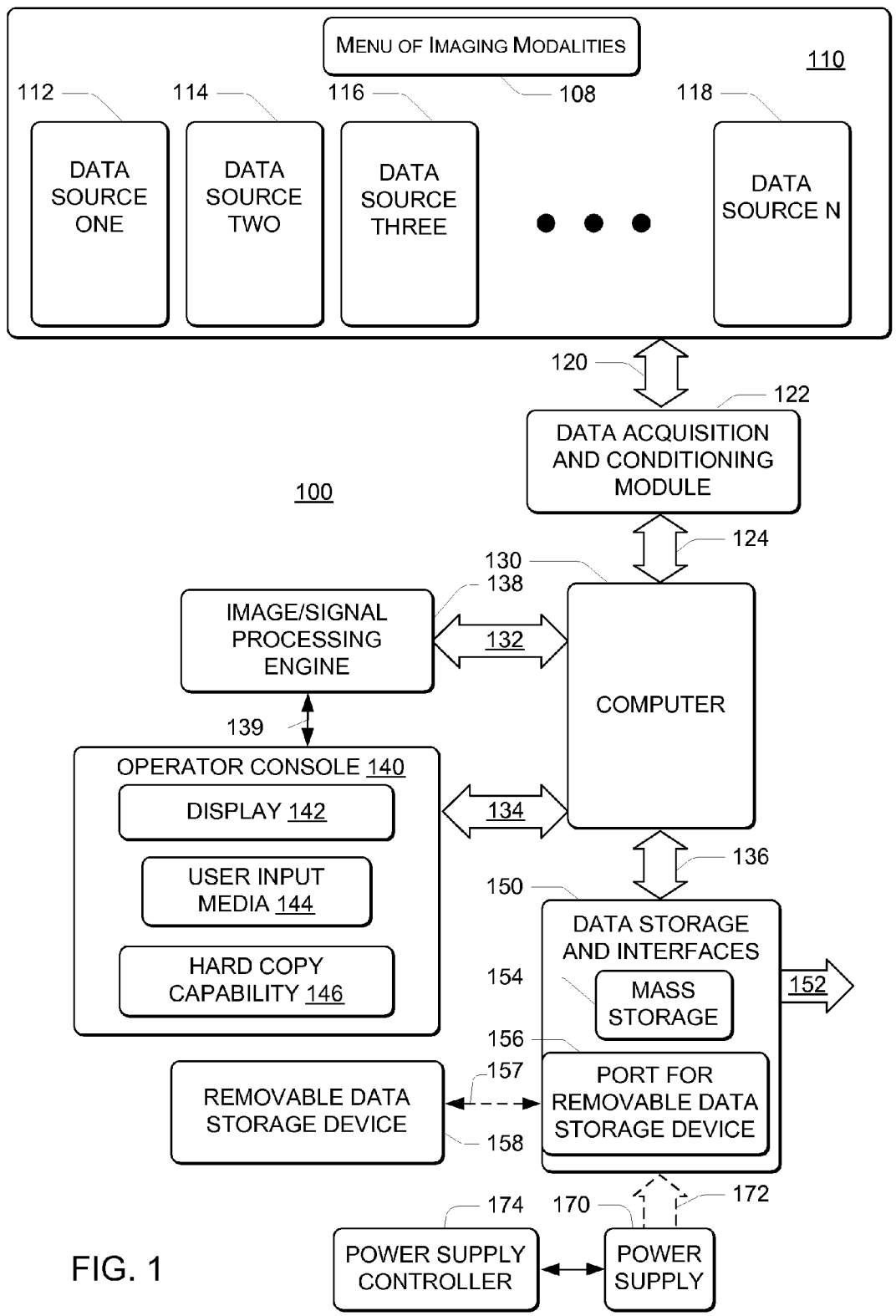
FIG. 1 is a block diagram of a system configured to provide and process multi-dimensional anatomical data taken via at least one element from a menu of different measurement technologies, in conformance with one or more purpose-specific applications.

In the following detailed description, reference is made to the accompanying drawings that form a part hereof, and in which are shown, by way of illustration, specific embodiments that may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

The detailed description is divided into six sections. In the first section, intended meanings of terms used at least in the body of the disclosure are clarified. In the second section, a system level overview is provided. In the third section, construction of a model for an organ, in this example, the liver, is described. In the fourth section, a process for organ segmentation is discussed. The fifth section describes an exemplary environment within which the disclosed concepts may be implemented and practiced.

The sixth section presents a conclusion which reviews aspects of the subject matter described in the preceding sections of the detailed description. A technical effect of the subject matter described herein includes automated contemporaneous registration and segmentation of multi-dimensional anatomical data formed from a dataset representing one of a variety of assessment modalities (i.e., characterization tools), using a single software tool, for purposes including automated organ segmentation of such data from data collected using processes, apparatus and/or systems in conformance with the disclosed subject matter.

§ I. CLARIFICATION OF INTENDED MEANINGS OF TERMS

As used herein, the term "or" is intended to be interpreted in the conjunctive, unless otherwise state or obvious from context. In other words, the term "or" is intended to include at least one of two or more ideas which are similar in some way. Put another way, a disjunctive interpretation of "or" (analogous to the Boolean operator "XOR" or "exclusive OR"), viz., of a pair of items, one or the other but not both, is not generally the preferred or intended meaning.

As used herein, the term "pixel" means a two-dimensional unit cell or elementary picture element in a display, where an image may be formed by tiling pixels appropriately. As used herein, the term "voxel" means a three-dimensional unit cell for representation of three-dimensional data fields. Pixels and voxels each have one or more sets of values associated with them, e.g., corresponding to coordinates in a tiled pixel mosaic or a three-dimensional region of space described by a suitable set of voxels arranged in a fashion analogous to the tiled pixel mosaic of the two-dimensional example.

As used herein, the term "axial" as applied to a view refers to a view of a horizontal slice through the patient or subject. For example, with the patient standing upright, an axial view corresponds to a view (up or down) representing a hypothetical slice along a cut plane extending, for example, from the navel to and through the spinal column, parallel to the ground, or any cut plane parallel to the ground.

As used herein, the term "coronal" as applied to a view refers to a view, from either side, of a slice lying generally in or parallel to a frontal plane passing through the long axis of the body of the patient or subject. For example, a coronal view of a slice through the liver would be a view of a slice generally along a vertical cut plane that extends from one side of the patient to the other.

As used herein, the term "sagittal" as applied to a view refers to a view along a plane or surface generally at right angles to the planes of both the axial and the coronal views described hereinabove. In other words, the term "sagittal" refers to a plane generally parallel to a plane extending along the long axis of the patient or subject, such as a plane dividing the patient or subject into what are usually bilaterally symmetric parts, i.e., a plane extending from front to back and also from top to bottom or vice versa.

Consequently, a set of axial, coronal and sagittal views through an organ typically correspond to generally mutually orthogonal views. In other words, any one of these three views is generally orthogonal to both of the other two views. Multidimensional data collection modalities result in a body of voxel data such that each of these types of views (and other orientations, including non-linearly scaled views, may be formed from the body of voxel data as well) may be arbitrarily constructed from the ensemble of voxel data descriptive of the internal structure of the patient or structure.

Collectively, a family of axial, coronal and sagittal views relative to a subject organ may be organized such that a point of mutual intersection of all three viewing planes corresponds to a location within the interior of the subject organ. When that triple intersection point corresponds roughly to a centroid of the subject organ, the collected family of views may facilitate formation of a three-dimensional view, in the mind of a party who is viewing all three sections contemporaneously, to a degree of accuracy that depends to some extent on the familiarity that the individual has with human anatomy and the level of experience applicable to the genre.

As used herein, the term "registration" generally refers to alignment of features contained in at least portions of two or more images or datasets, in order to establish correspondence between multiple points representative of the same physical feature. In other words, data elements representing corresponding portions of each of two or more datasets are co-located or coordinated or related to one another in order to facilitate formation of a meaningful combination of, or of formation of meaningful relationships between, related or analogous pairs or other subsets of elements of the two or more datasets.

Segmentation, in the sense used in the context of this disclosure, involves differentiating between pixel or voxel or other multidimensional data (e.g., an ultrasound image representation, a fluoroscopic display or a film x-ray) representing various organs, tissues, sacs or voids which may be filled with air, or water or other fluids, foreign objects (such as surgically-implanted items, or objects inserted via other means and not having any particular medical purpose, for example, coins a patient may have swallowed, or projectiles resulting from some injury) and any other non-organ inclusions and identification of data representing a specific organ in order to assess properties of that organ. Segmentation may also include identifying data describing pathological features. Segmentation may be employed to clearly distinguish or define organs, or for quantification of the size of a lesion.

As used herein, the term "segmentation" means the process of partitioning an image or spatially-organized data descriptive of an organ in a subject or patient. In a broad sense, segmentation may refer to partitioning of an analog image or spatially-organized analog data or digitized versions formed therefrom. In the context of the subject matter of this disclosure, segmentation more often is applicable to a digital image or spatially ordered dataset into multiple regions, such as sets of pixels, or of partitioning a digital three-dimensional representation or spatially-organized multidimensional dataset into multiple regions, such as sets of voxels.

The goal of segmentation is to simplify and/or change the representation of a spatially ordered dataset into something that is more meaningful with respect to a subject organ, and as a way of facilitating analysis and quantification of anatomical features of interest. Image or two-dimensional data field segmentation is typically used to locate objects and boundaries (lines, curves, etc.) in images, with similar processes being employed with volumetric data.

The result of segmentation is a set of regions that may collectively cover the entire image or volumetric dataset, or a set of contours extracted from the image or volumetric dataset via edge detection and other conventional signal or image processing techniques. Each of the pixels or voxels in a given region are similar with respect to some characteristic or computed property, such as color, intensity or texture. Adjacent regions are significantly different with respect to the same characteristic(s) in some distinguishable manner.

As used herein, the term "histogram" refers to a function h(I) which assigns a probability p=h(I) to each normalized intensity value I. For example, a probability p of 0.5 for an intensity I of 100 Hounsfield units means that half of the voxels or pixels have an intensity value of 100 Hounsfield units. In other words, when comparing normalized intensities $I_1$ and $I_2$ from different measurement modalities using different physical phenomena to probe the subject, those normalized intensities I are fitted to a common scale, such as to values ranging from zero to one, inclusive (or $I \epsilon [0, 1]$).

Put another way, the histogram value p=h(I) at a specific intensity value I shows the probability p of a voxel or pixel to have this intensity value I. In general, histograms may relate to a single image, or may relate to two or more images. Graphic representations of histograms may be organized such that the abscissa (i.e., x axis) references the intensity I, and the ordinate (i.e., y axis) references the probability p=h(I).

As used herein, the term "core region" refers to a connected three-dimensional region that is entirely within the organ and which does not contain vessel or tumor regions.

§ II. SYSTEM OVERVIEW

FIG. 1 is a simplified diagram of an overview of a modified system 100 configured to improve automated processing and segmentation of representations of internal organs using data collected via any element selected from a list or menu of imaging modalities 108, where that element represents a respective one of multiple imaging/assessment modalities 110. The imaging/assessment modalities itemized via the menu 108 may include measurements based on X-ray imaging operations, measurements performed using magnetic resonance imaging techniques or data collected via any one or more of those or other technologies. The system 100 accepts data from at least one of data source one 112, data source two 114, data source three 116, . . . , data source N 118. The array 110 of data sources 112, 114, . . . , 118, may include a computerized tomography system 112, a magnetic resonance imaging system 114, an ultrasound imaging system 116 or an x-ray angiography system 118, for example. The array 110 of data sources 112, 114 . . . , 118 may include one or more on-site measurement systems 112, 114, . . . , 118 or may include capability of accepting data from one or more remote data sources 112, 114, . . . , 118, for example via a LAN, WAN, the Internet, etc., as described below in more detail in §V with reference to FIG. 22.

The system 100 also may include a bus 120 for coupling data from one or more of the array of data sources 110 to a data acquisition and conditioning module 122 having an output coupled to a bus 124. One or more computers 130 including one or more processors (not illustrated in FIG. 1) accept data from the bus 124. The one or more computers 130 exchange data with other components of the system 100 via buses 132, 134 and 136.

For example, the bus 132 acts to transfer data and control signals to a module 138 that is configured as an image processing engine. In general, buses such as 132, 134, 136 are configured for exchange of signals and data to and/or from the computer 130 as well as other elements of the system 100 and/or external computation or communications resources (not illustrated in FIG. 1).

The system 100 also includes a signal path 139 and an operator console 140. The operator console 140 is coupled to the computer 130 through the bus 134. The operator console 140 includes one or more displays 142, a user input interface 144 and may include or be coupled to a hard copy engine 146 for formation of a copy of an image in a suitable media, such as paper, transparencies or film, or which may provide a three-dimensional model.

The user input interface 144 may include a touchscreen, keyboard, a mouse or other tactile input device, capability for voice commands and/or other input devices. The one or more displays 142 provide video, symbolic and/or audio information relative to operation of system 100, user-selectable options and images descriptive of the test subject (not illustrated), and may display one or more graphical user interfaces or GUIs for facilitating user selection among various modes of operation and other system settings.

The image processing engine 138 facilitates automation of accurate measurement and assessment. The image processing engine 138 is capable of forming multiple, coordinated images for display, for example via the monitor 142, to provide the types of depictions shown and described below and in the following sections of the disclosure. The image processing engine 138 may comprise a separate and distinct module, which may include application-specific integrated circuitry, or may comprise one or more processors coupled with suitable computer-readable program modules, or may comprise a portion of the computer 130 or other computation device.

The system 100 also includes data storage and memory devices 150, coupled via the bus 136 to the computer 130 through suitable data interfaces. Datasets representing three-dimensional voxel data and image or two-dimensional pixel data typically conform to the digital imaging and communications in medicine (DICOM) standard, which is widely adopted for handling, storing, printing and transmitting information in medical imaging, although other standards may be usefully employed.

The DICOM standard includes a file format definition and a network communications protocol. The communication protocol is an application protocol that uses TCP/IP to communicate between systems, as represented in FIG. 1. DICOM files can be stored in memory devices 150 and retrieved therefrom, and may be exchanged between two entities that are capable of receiving image and patient data in DICOM format.

The memory devices 150 include data interface 152, mass data storage capabilities 154 and one or more removable data storage device ports 156. The one or more removable data storage device ports 156 are adapted to detachably couple (as represented by dashed bidirectional arrow 157) to portable data memories 158, which may include optical, magnetic and/or semiconductor memories and may have read and/or write capabilities, and which may be volatile or non-volatile devices or may include a combination of the preceding capabilities.

The system 100 includes data acquisition and conditioning module 122 that has data inputs coupled to the array of data sources 110 and that is coupled by the bus 120 to the one or more computers 130. The data acquisition and conditioning module 122 captures input data and outputs information digital form, to be supplied to the one or more computers 130 for ultimate display via at least one of the displays 142 and for potential storage in the mass storage device 154 and/or data exchange with remote facilities (not shown in FIG. 1), via data interface 152, for example, or using one or more removable data storage device ports 156. The acquired image data may be conditioned in either the data acquisition and conditioning module 122 or the one or more computers 130 or both.

The system 100 also includes a power supply 170, coupled via interconnections represented as a power supply bus 172, shown in dashed outline, to other system elements, and a power supply controller 174. In some embodiments, the system 100 is configured to be a mobile system equipped with a portable power supply 170, such as a battery. In other words, the system 100 may comprise a wheeled unit and may be electromotively powered in self-contained fashion, lending physical agility to the ensemble of attributes offered by the system 100.

Figure 2:
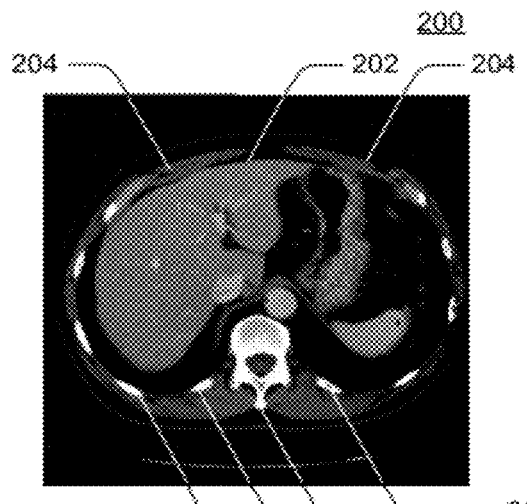
FIG. 2 depicts a representative image of an abdominal slice through liver and neighboring organ tissue which is derived from computerized tomographic x-ray data, in accordance with the subject matter of the present disclosure.
Figure 3:
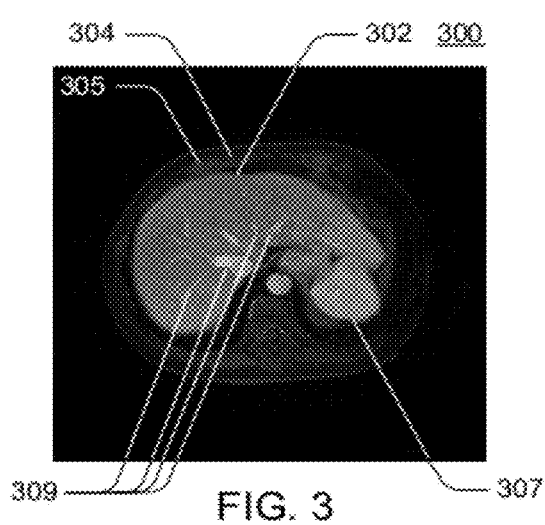
FIG. 3 is analogous to FIG. 2, but instead shows a typical image of liver and surrounding tissues which was formed using data collected via magnetic resonance imaging techniques, in accordance with the subject matter of the present disclosure.

Multi-dimensional data collected from, and representative of, a portion of the test subject (not illustrated) may be collected and/or processed via many different types of tools, each tending to enhance some portion of information content described by the data and thus contributing to the gamut of capabilities of the system 100, and the spectrum of applications of which may be served by the system 100. One result can be enhancement of analytical results from different measurement modalities or varying types of signal processing tools, which may be implemented via the signal processing engine 138 or one or more program modules, or between measurement results corresponding to different measurement times and/or measurement phases. FIGS. 2 and 3 below illustrate examples of images such as may be displayed or made visible via the display 142 or the hard copy capability 146.

FIG. 2 shows a two-dimensional slice 200 through a three-dimensional body of voxel data characterizing a liver 202 via CT scanning. The representation 200 of FIG. 2 shows abdominal wall 204 as being of similar intensity as liver parenchyma 202, and, in contrast, bony tissue 205 is represented as areas of high intensity, or represented as white regions, in a black-and-white representation scheme.

Liver parenchyma 202 show up as a relatively uniform gray region, with some features internal to the liver parenchyma. Overall, the gray region representing liver parenchyma 202 has a relatively sparse population of regions showing significant intensity variations.

FIG. 3 provides an image of a two-dimensional slice 300 through a three-dimensional body of voxel data characterizing a liver 302, analogous to the image 200 of FIG. 2, but where the voxel data have been collected using magnetic resonance imaging technology. The image 300 shows liver parenchyma 302, abdominal wall muscles 304, bony tissues 305, spleen tissues 307 and vessel structures or reticulations 309 within the liver parenchyma 302.

In the view 300 formed using MRI data, bony tissue 305 is hardly visible at all, and is difficult to distinguish from other features constituting abdominal wall tissues 304. This stands in marked contrast to the image 200 of FIG. 2, where bony tissues 205 are strikingly intense and display with very high contrast to tissues surrounding the bony tissues 205.

A neighboring organ 307 is of similar intensity as the liver parenchyma 302. Also, the reticulations 309 on the liver parenchyma 302 cause the liver parenchyma 320 to be far more inhomogeneous than is the case in the representation of FIG. 1.

Comparing images 200 and 300 of FIGS. 2 and 3 shows some of the differences in contrast of different elements of a particular organ, the liver, result in a far less homogenous dataset when the data are collected via MRI in comparison to that collected via CT scanning. Consequently, automated processing tools developed in the context of CT scanning, which rely on uniformity of liver parenchyma as one of the key characteristics for processing of the voxel data to segment the organ being studied, are neither useful for automated processing of MRI data nor are such tools readily or obviously adaptable to automated processing or segmentation of MRI data, particularly in the presence of significant pathology.

Aspects of the measurement processes, problems and analysis useful for more than one modality of data measurement, and which are capable of accurate organ segmentation, despite differences in homogeneity and artifact types encountered that are characteristic of the modality employed for data collection, are discussed below with reference to §§ III through V. Development of organ models useful in the context of the present disclosure is next described below in § III.

§ III. AN EXAMPLE OF ORGAN MODEL SYNTHESIS

In the following section, some aspects involved in forming models for various organs are described in the context of formation of a liver model, as an example. The models are subdivided into portions which may be independently statistically treated, allowing for more flexibility in accommodation of data types derived from different measurement modalities, such as CT, MRI, XA and the like.

FIGS. 2 and 3 represent an image 200 from a liver measurement done with computerized X-ray tomography and an image 300 from a liver measurement performed via magnetic resonance imaging, respectively, in accordance with an embodiment of the disclosed subject matter. The image 200 illustrates liver parenchyma 202, abdominal wall muscles 204 and bony tissues 205. In the image 200, the liver parenchyma 202 and the abdominal wall muscles 204 show similar intensity, and are adjacent, in some locations. Very bright artifacts result from bony tissue 205.

In the image 300 from the MRI measurement, liver parenchyma 302 and spleen 307 show similar intensities, and have portions adjacent one another. In FIG. 2, the intensity range for the liver 202 overlaps with the intensity range for the muscles 204, while in FIG. 3, the intensity range for the liver parenchyma 302 overlaps with the intensity range for the spleen 307, but is quite different from that of the abdominal wall 304. As a result, while specifying an intensity range descriptive of liver parenchyma 202 or 302 may be a necessary condition for automated segmentation of such data, intensity ranges alone that are only descriptive of the entire organ are not sufficient for permitting such automated signal processing and for differentiation of adjacent tissues.

Also, within the liver parenchyma 302 of FIG. 3, a significantly greater amount of detail or reticulation 309 is present than is the case with the liver parenchyma 202 of FIG. 2. Consequently, the task of differentiating data representing liver parenchyma 302 from other data involves a greater range of intensities, or, put another way, the MRI data are less homogeneous than CT data. Unfortunately, algorithms directed to automated characterization and segmentation of liver data collected using conventional contrast injection and CT scanning typically rely on the relative uniformity of liver parenchyma 202, FIG. 2, in order to establish criteria for differentiation of liver tissues from other features present in the data, as well as sorting voxels representing liver parenchyma from at least some of the types of artifacts typically encountered in data collected via CT scanning.

Consequently, prior art methodologies and computer programs developed for automated characterization of liver tissues 202 obtained from CT voxel data are susceptible to problems resulting from large tumor masses (which tend to present intensities different than that of healthy liver tissue) and are extremely ill-suited to adaptation to processing of voxel data collected via MRI characterization processes. As of the date of the present disclosure, the literature is sparse, at best, regarding efforts to develop a universally applicable automated characterization and segmentation tool capable of handling voxel data from a menu of data measurement modalities. There presently is no practical, commercially-available tool capable of automated segmentation of liver tissue data from either MRI or CT scanning.

Tools adapted to the peculiarities of data collected using the CT modality have strongly resisted adaptation to data collected via the MRI modality. Development of tools for characterization of MRI data or images don't represent as mature a field of endeavor as is the case for CT data.

The task of sorting data to differentiate organ portions for MRI data is substantially different than is the case for CT data. These sorting tasks become significantly more complex in the presence of large anomalies, such as tumors, and also because the kinds of artifacts manifested by each of these measurement techniques are substantially different. For example, breathing artifacts manifest differently in MRI data than in CT data, due to differences in the measurement times required (MRI data take much longer to be acquired than do CT data, leading to breathing artifacts, as well as other, technology-related artifacts).

In order to accommodate the differences in characteristics noted between just these two types of imaging data, let alone the unique characteristics of other modalities capable of collecting voxel data characterizing a subject, a new type of organ model was developed. This novel, innovative organ model splits the organ into subregions, for example, in accordance with the Couinaud classification scheme, which is particularly well suited to characterization of liver parenchyma and for purposes such as planning for live donor transplantation or for surgery involving removal of any substantial amount of liver parenchyma from a patient. The Couinaud classification scheme subdivides a liver into eight sub-regions, with each of those eight sub-regions having independent vasculature inflow and outflow and biliary drainage.

As a result, each of those eight sub-regions may be independently resected without significant damage to any of the other sub-regions, and each of these sub-regions also presents potential for transplantation into a donee patient with reason to believe that the transplanted portion can be successfully grafted into a recipient donee. It will be appreciated that other schemata for subdivision of organ tissue may be employed and may offer advantages or benefits vis-à-vis a particular organ, while preserving the benefits of the disclosed techniques for highly automated, accurate, and very rapid organ characterization and/or segmentation of voxel data obtained via any one of a larger ensemble of modalities than has heretofore been possible. Formation of a particular example of such an organ model is described below in more detail, for the relatively difficult case of real-time automated liver data segmentation, with reference to FIG. 4, and the examples of FIGS. 5 through 10, and associated text.

Figure 4:
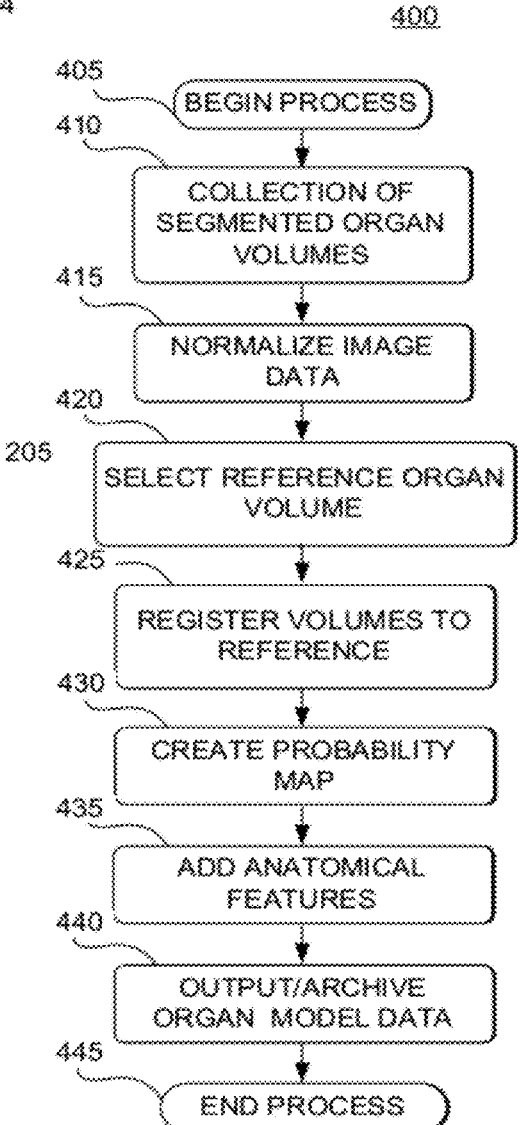
FIG. 4 is a flow chart illustrating main components and processes in constructing a model for an organ, in accordance with the subject matter of the present disclosure.

FIG. 4 is a flow chart 400 illustrating main components and processes in constructing a model for an organ, in accordance with the subject matter of the present disclosure. The process 400 begins in a block 405.

In a block 410, a collection or set of manually-segmented organ volumes is formed, which may be data obtained from any of the data sources 112, 114, . . . , 118, of FIG. 1. In one example, sixty independent measurements of liver parenchyma, vasculature and the like are segmented by hand by trained radiologists, and are collectively captured in the block 410. Control then passes to a block 415.

In the block 415, the process 400 normalizes the set of image or voxel data captured in the block 410. In one embodiment, the normalization includes transformation of the organ volumes that were collected in the block 410 to an isotropic voxel spacing. Control then passes to a block 420.

In the block 420, the process 400 selects a reference organ volume. In one embodiment, the volumes from the organ measurements which were collected in the block 410 are averaged to provide a reference volume. Control then passes to a block 425.

In the block 425, the process 400 registers each of the manually-segmented organ volumes that were collected in the block 410 to the reference volume from the block 420. In one embodiment, the registrations are performed using conventional similarity transformations, such as three-dimensional similarity transformations. Control then passes to a block 430.

Figure 5:
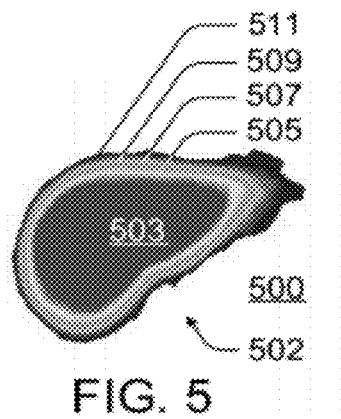
FIGS. 5 through 7 provide representations of axial, sagittal and coronal aspects, respectively, of a probability map formed in the process of developing a model for an organ, in accordance with an embodiment of the disclosed subject matter.
Figure 6:
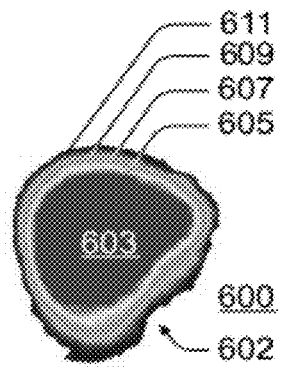
Figure 7:
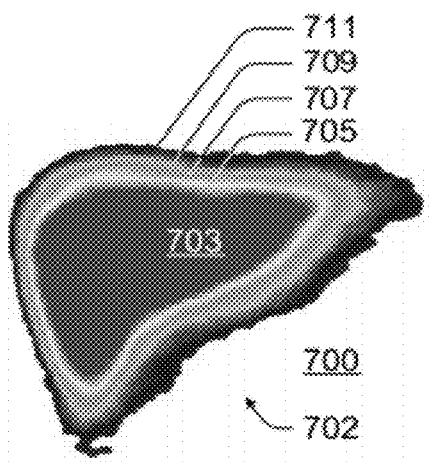

In the block 430, the process 400 forms a probability map. In one embodiment, the probability map is formed by summing the registered images and then normalizing the values to a range such as [0-1]. Examples of representations of axial, sagittal and coronal aspects, of a probability map used in forming a model of an organ are shown in FIGS. 5 through 7, respectively. Control then passes to a block 435.

In the block 435, the process 400 adds anatomical features to the probability map formed in the block 430 and represented by the various views shown in FIGS. 5 through 7. In one embodiment, the anatomical features may be represented by Couinaud classification of an organ into M many portions or segments $S_i$. Couinaud classification divides an organ such that each portion or segment $S_i$ may be resected without damaging the other portions or segments $S_{j\ne i}$, where each of i and j are integers in a range of 1 to M, or i, j∈{1, M}.

Figure 8:
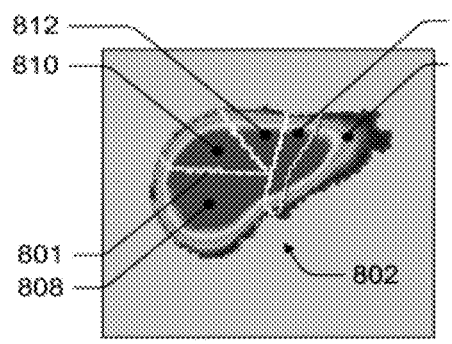
FIGS. 8 through 10 include images depicting axial, sagittal and coronal views, respectively, of the probability maps of FIGS. 5 through 7, respectively, extended, in these examples, via Couinaud classification of the liver into anatomically meaningful partitions, each capable of being independently resected, in accordance with an embodiment of the disclosed subject matter.
Figure 9:
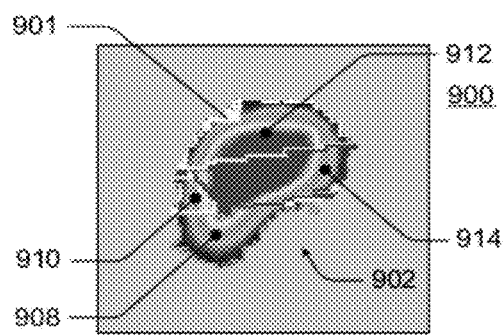
Figure 10:
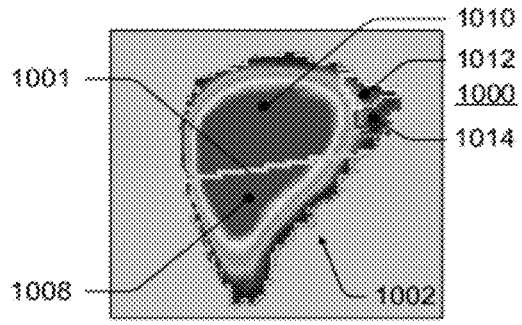

In the example illustrated by FIGS. 8 through 10, data being used to form a liver model is divided into eight such independent portions or segments $S_i$, in conformance with anatomically significant criteria. Each of FIGS. 8 through 10 depicts portions of a different subset of these eight segments $S_i$, corresponding to an associated statistical data zone, independent of those applicable to any of the other seven segments $S_i$.

Figure 11:
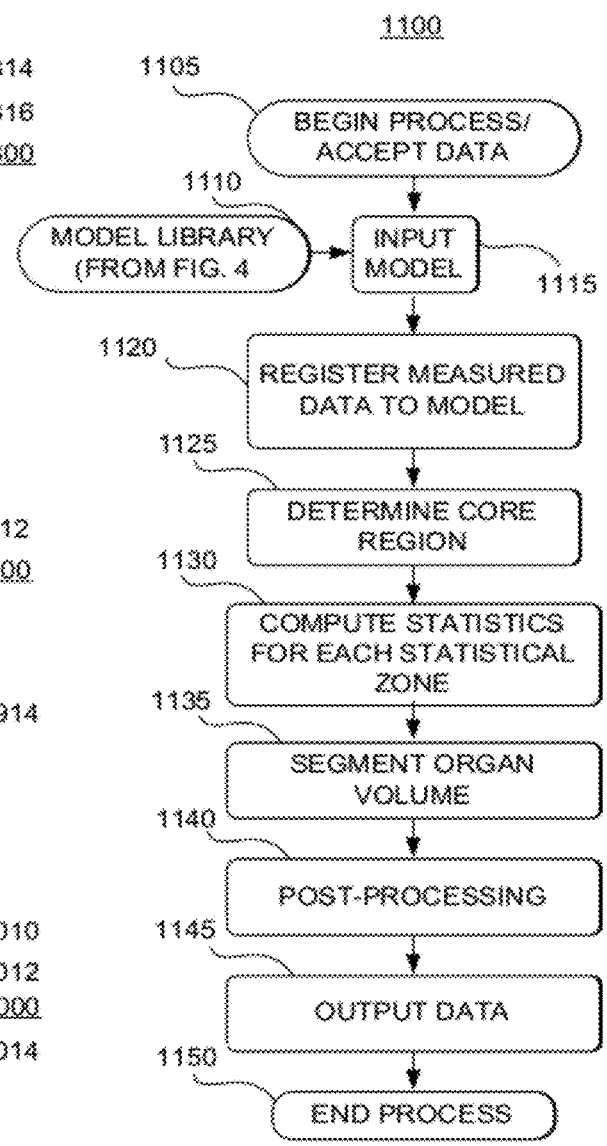
FIG. 11 is a flow chart illustrating main components and processes for segmentation of volumetric data obtained via one or another measurement modality, in accordance with an embodiment of the disclosed subject matter.

In turn, subdivision of the registered measured voxel data relevant to the organ volume into such independent portions or segments or associated statistical data zones $S_i$ by the registration that is part of the process 1100 of FIG. 11 (see at least, e.g., the blocks 1120 and 1130 and associated text, infra) allows each such portion or segment $S_i$ to be analyzed using independent statistical data derived from the measured data relevant to that specific portion or segment or associated statistical data zone $S_i$.

In other words, when the image data from the measurement are registered to the model (as described with reference to the process 1100 of FIG. 11 and illustrated and described with reference at least to FIGS. 12 though 21, infra), including the anatomical features which are added to the model in the block 435 of the process 400 of FIG. 4, the measured data will correspondingly be registered to an appropriate anatomical feature that forms one of the M segments $S_i$ which collectively span the volume of the organ model. Put another way, each segment $S_i$ of the measured data will also be registered to and map to a corresponding one of the M many anatomical segments $S_i$ into which the organ model data have been divided.

As will be subsequently described in more detail with reference to block 1130 et seq. of FIG. 11, and illustrated and described at least with regard to FIGS. 16 through 18 and associated text, the measured intensity statistics corresponding to the segments $S_i$ in the model allow independent sets of intensity statistics {$S_i$} spanning a respective range extending from a lowest value of $S_{MIN\_i}$ to a highest value $S_{MAX\_i}$ to be computed for each segment $S_i$ independently. As a result, the subject matter disclosed and taught by this disclosure overcomes otherwise intractable computational issues devolving from strongly overlapping intensity ranges that may include portions or all of organ parenchyma, tumors or other pathologies, neighboring organs or anatomical structures etc.

The increased overlap which is characteristic of MRI data of the various intensity ranges in comparison to measured data acquired using other imaging techniques, such as CT scanning, is due to the more highly detailed and reticulated, and therefore less homogeneous, intensity values presented by MRI data. The disclosed technique thus acts to facilitate rapid, accurate and automated segmentation of organ voxel data, even for organs such as the liver, where the nature of the intensity variations manifested via MRI measurements inherently result in more complex and inhomogeneous intensity data than presented via other digital imaging technologies, such as, in particular, intensities represented in data from CT measurements.

It will be appreciated that the anatomical features used to segregate portions or segments $S_i$ developed in order to subdivide a model of an organ may be selected based on other types of criteria. For example, anatomical information may be added based on one or more features such as positions within the organ, relationships to other organs or anatomical structures, on curvature represented by a typical organ of the type, on intensity, for example, if necessary for some modality-specific segmentation, or on any one or more of these and/or other distinguishable anatomical aspects of any organ.

In other words, each portion in the Couinaud classification is anatomically significant in possessing vasculature and other elements which may be independent of those of each of the other portions or segments $S_i$. Views of the exemplary liver probability map, shown in axial 500, coronal 600 and sagittal 700 perspectives, as depicted in FIGS. 5, 6 and 7, respectively, after division into such portions or segments $S_i$, are provided in the views of FIGS. 8 through 10, corresponding to axial 800, sagittal 900 and coronal 1000 views, respectively. Control then passes to a block 440.

In the block 440, the process 400 outputs organ model data from the model-formation module, and/or stores such data, for example in the data storage capability 150 of FIG. 1, or archives such data, for example, in a library of organ models, which may be later accessed via the bus 136 or the bus 152 of FIG. 1. The process 400 then ends in a block 445. It will be appreciated that the various operations (e.g., 410, . . . , 440) may correspond to apparatus or modules which are configured to execute these operations or may be programmed as computer code modules including computer-readable instructions, which, when executed by one or more processors (e.g., 130 of FIG. 1, supra, or 2204 of FIG. 22, infra), cause the one or more processors to carry out corresponding acts.

In the process of segmentation characterizing liver attributes, the liver is often assumed to be the abdominal organ with the largest volume. This obviously is not the case for other organs, and, in rare cases, it isn't true for the liver, either. Consequently, simple rules, methods or algorithms, based on intensity ranges, intensity limits or size, are not adequate for general automated registration or segmentation processes. As a result, sophisticated techniques having substantial flexibility are needed in order to determine a suitable plurality intensity ranges for meaningful representation (providing, for example, significant diagnostic value) of the organ of interest in each measurement.

FIGS. 5 through 7 provide probability map views 500, 600, 700, respectively, of an axial aspect 502, a sagittal aspect 602 and a coronal aspect 702, respectively, at one stage in formation of an exemplary organ model, in accordance with an embodiment of the disclosed subject matter. The probability map views 500, 600, 700 each correspond to the normalized sum over a number of manually segmented subject organ datasets, formed as the output of the block 430 in the process 400 of FIG. 4. In FIG. 5, the axial aspect 502 includes regions of relatively higher or lower probability, with a central portion, 503, representing a highest or greatest probability, and where successive radially outward surrounding portions 505, 507, 509, 511, each corresponding to a distinct gray scale value band and respectively denoting successively lower probability zones.

Similarly, a central portion 603 of the sagittal aspect 602 of FIG. 6 represents a highest probability, with successive radially outward surrounding portions 605, 607, 609, 611, each shown in a different gray scale representation in FIG. 6, denoting successively lower probability zones. In an analogous manner, the coronal view 702 of FIG. 7 depicts a central portion 703 corresponding to a highest probability value, and successive surrounding portions 705, 707, 709, 711, each shown in a different shading representation in FIG. 7, representing progressively lower probability values. It will be appreciated that various colors may be used to represent and visually differentiate the value bands or zones or portions of FIGS. 5 through 7, and other analogous FIGs. shown in the present disclosure.

It will be apparent to those of relevant skill in the art that various levels of probability may be denoted in the types of probability map views 500, 600 and 700 shown in FIGS. 5 through 7, respectively. Delineations may correspond to constant increments, e.g., 100%, 90%, 80% and the like, or may vary nonlinearly, e.g., 100%, 90%, 50%, or may be structured in any other manner consistent with a designated purpose, or chosen to emphasize or clarify a particular aspect of the subject organ model probability map.

After the probability map represented by the views 500, 600 and 700, of FIGS. 5 through 7, respectively, has been formed as described with reference to these FIGs. and to the block 430 of the process 400 of FIG. 4, a series of divisions are made in the probability map, as described above with reference to the block 435 of FIG. 4. One example of the type of result which finds some utility in the case where the subject organ being modeled is a liver is described and illustrated via the images depicted in FIGS. 8 through 10, described below.

FIG. 8 through 10 include exemplary images 800, 900 and 1000, respectively, after each image has been divided, as indicated by division lines 801, 901 and 1001, respectively, into a series of portions or segments $S_i$, in conformance with the exemplary Couinaud classification of the liver into anatomically meaningful partitions (described hereinabove in more detail with reference to FIG. 4), with each delineated portion or segment $S_i$ being capable of being independently resected, in accordance with an embodiment of the disclosed subject matter. FIG. 8 includes a view 800 of an axial slice 802 through the probability map, FIG. 9 provides an image 900 representative of a sagittal slice 902 through the probability map, while FIG. 10 corresponds to a coronal slice representation 1002.

It will be appreciated that, in the interests of clarity of explanation and to provide greater discrimination of disparate types of elements depicted within the illustrations, and in part owing to the substantial range of contrast variations present in FIGS. 8 through 10, "touch" lines associated with, and extending between, referential numerical labels and their associated Couinaud sub-portions, as illustrated in these FIGs., terminate in small black dots contained within the step-wise linear peripheral designations 801, 901, 1001, thus serving to delineate the displayed portions of the anatomically-significant sub-portions within the context of the developing model of the exemplary subject organ.

In contradistinction, none of the other identificatory numerical labels are associated with such terminations. As well, and to yet even more clearly show correspondence between the individual sub-portions and the respective non-alphabetic labels, the black dots are only associated with the sub-portion numerical labels. Consequently, this convention thus serves to enhance the reader's ability to distinguish between reference characters associated with other features illustrated in these FIGs., and those indicia designating the individual sub-portions.

In the axial slice view 802 of FIG. 8, a series of step-wise linear boundary lines 801 divide the portion of the subject organ into five visible subdivisions $S_i$, designated (starting from a bottom portion, 808, and proceeding clockwise) by the reference characters 808, 810, 812, 814 and 816. An analogous set of boundary delineations 901 are superposed on a sagittal slice view 902, as depicted in FIG. 9, and, again starting from a bottom of the liver slice presented via this image 900, and proceeding clockwise, a sequence of four subdivisions $S_i$, sharing some common boundary portions, viz., sub-portions 908, 910, 912 and 914, are illustrated.

Again, and similarly to the conventions employed in the displayed images of FIGS. 8 and 9, a set of horizontal and vertical line segments 1001, as noted in proximal relationship to elements or segments $S_i$ depicted in a coronal slice view 1002, of FIG. 10, and following a similar convention, four different sub-portions, or segments $S_i$, designated by reference characters 1008, 1010, 1012 and 1014, with the line segments 1001 serving to separate and distinguish or define sub-portions $S_i$ of varying size, as also described with regard to each of FIGS. 8 and 9, are noted.

Thus, a series of organ models, corresponding to various subject organs and subdivided into sub-portions $S_i$ in conformance with relevant landmark features, or distinguishing sub-portions $S_i$, each distinct in some anatomically or medically relevant manner. Put another way, organizing sub-portions $S_i$ within a model for a selected organ in order to simply capture measurable characteristics or features lending a statistically distinctive signature or characteristics to at least one sub-portion $S_i$ of a subject organ, where a significant component of that sub-portion $S_i$ corresponds to a locus of values distinguishable in some manner from other clusters or loci of values, each associated with another sub-portion $S_{j \neq i}$, provides a powerful handle that may be employed in segmenting different modalities of data, through deployment of a single, integrated, accurate, real-time analytical tool, as will be described in more detail below in § IV of this disclosure, in conformance with a broad-brush overview of this methodology through the medium of the high-level flowchart described below with reference to FIG. 11.

§ IV. SEGMENTATION

Some of the practical applications of image or volumetric segmentation in medical imaging include locating and quantifying tumors and other pathologies; measurement of tissue volumes; computer-guided surgery; diagnosis; treatment planning (e.g., for transplantation, or for insertion of foreign materials into the body) and study of anatomical structure. In particular, while the Couinaud classification scheme discussed in conjunction with the example of liver model formation (in § III, supra), quantification is clearly helpful and presents strong advantages in some highly specific applications, and yields extremely targeted and useful information, independently of the particularized data harvesting modality employed in collecting data needed for planning living donor transplantation of portions of an organ, such as a liver, from a donor to a donee, there are a plethora of alternative schemata providing equally strong discrimination factors useful in segmentation of data from arbitrary data collection modalities.

With reference now to FIG. 11, a flow chart 1100 illustrating main components and processes for segmentation of volumetric data obtained via one or another measurement modality, in accordance with an embodiment of the disclosed subject matter, is provided. The process 1100 initiates in a block 1105.

In the block 1105, the process 1100 accepts measured multidimensional data. In one embodiment, the measured multidimensional data may be either voxel data derived from MRI characterization of the subject or patient, or may be voxel data collective via CT scanning and the data collection modality may be indicated in a data field or file header portion, as described above in text associated with FIG. 1 with reference to the DICOM image data protocols. A library of model data 1110 (from FIG. 4, for example) for specific organs also is available. Control then passes to a block 1115.

In the block 1115, an appropriate model from the library 1110 is input as well. Control then passes to a block 1120.

In the block 1120, the process 1100 proceeds to register the measured data from the block 1105, which characterizes a particular patient or subject, with a suitable model 1110, which was previously stored (e.g., in mass storage 150 of FIG. 1 as described above with reference to block 440 of FIG. 1) or which is obtained from external data sources, for example, via a bus, such as the bus 152. In one embodiment, the model is selected from a library of models for specific organs, each developed in consonance with the methodologies and the process 400 described herein with reference to FIG. 4 and illustrated in § III (supra), entitled "An Example Of Organ Model Synthesis."

The registration of the measured data to the model that takes place in association with the block 1120 involves several sub-tasks or acts. A first portion of the registration performed as represented by the block 1120 involves determination of intensity thresholds, $G_{MIN}$ and $G_{MAX}$, which are described below in more detail with reference to FIG. 12.

Figure 12:
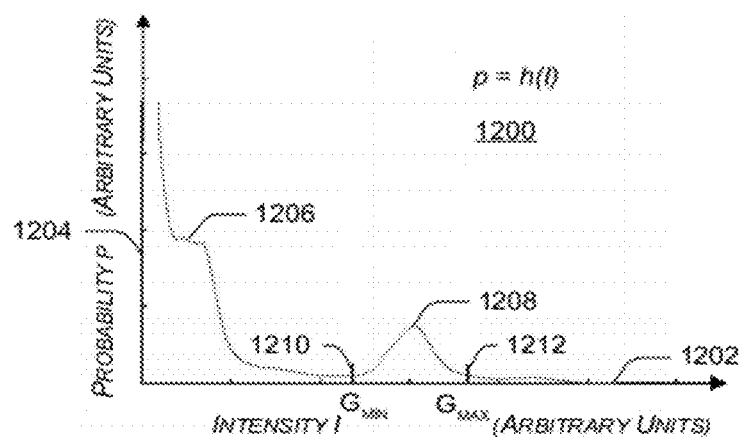
FIG. 12 depicts a histogram of voxel intensities, showing global intensity thresholds, represented as vertical lines representing intensity limits $G_{MIN}$ and $G_{MAX}$ and bracketing a local intensity maximum which is associated with organ parenchyma, in accordance with an embodiment of the disclosed subject matter.

FIG. 12 represents a histogram 1200 of intensities associated with individual voxels, in accordance with an embodiment of the disclosed subject matter. The histogram 1200 includes an abscissa 1202 (labeled "INTENSITY I") and an ordinate 1204 (labeled "PROBABILITY p"), each represented in terms of arbitrary units.

A trace 1206 representing a probability function p=h(I) includes a local maximum 1208, which is associated with organ parenchyma, that is bracketed by values labeled $G_{MIN}$ 1210 and $G_{MAX}$ 1212. In one embodiment, local maxima are examined from highest to lowest intensity values, and a first local maximum bounded as described by the environment [$G_{MIN}$, $G_{MAX}$] is selected which includes at least a predetermined threshold percentage (which may be adjustable) of the image voxels.

Use of a predetermined threshold percentage value, such as 5%, avoids selection of a local maximum and associated environment that may correspond to a small, but very bright, non-organ region. Other types of criteria may be developed for other purposes or for registration of different organ types with suitable models. The trace 1206 represents typical data that include description of a liver.

After the intensity thresholds $G_{MIN}$ 1210 and $G_{MAX}$ 1212 have been established, the data are thresholded. That is, data (voxels) having intensity values falling within the value range represented by the intensity thresholds $G_{MIN}$ 1210 and $G_{MAX}$ 1212 are identified for further processing.

Figure 13:
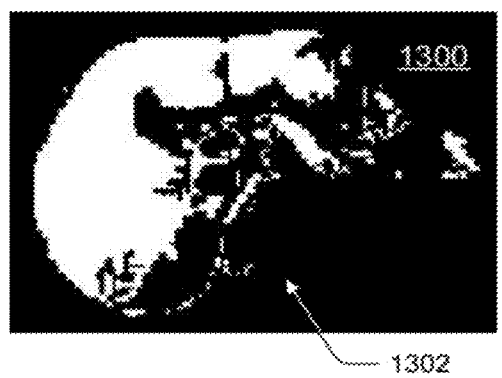
FIG. 13 illustrates an image, such as the images shown above, but after thresholding the input image data using the intensity limits $G_{MIN}$ and $G_{MAX}$ of FIG. 12, in accordance with an embodiment of the disclosed subject matter.

FIG. 13 illustrates an image 1300, such as the images shown above, but after thresholding the input image data by the intensity limits $G_{MIN}$ 1210 and $G_{MAX}$ 1212 of FIG. 12, in accordance with an embodiment of the disclosed subject matter. Data elements or voxels falling within the range bounded by those intensity limits are represented as white areas 1302 in FIG. 13, while data elements or voxels having intensities outside that range are ignored, as represented by the dark portions of the image 1300.

Figure 14:
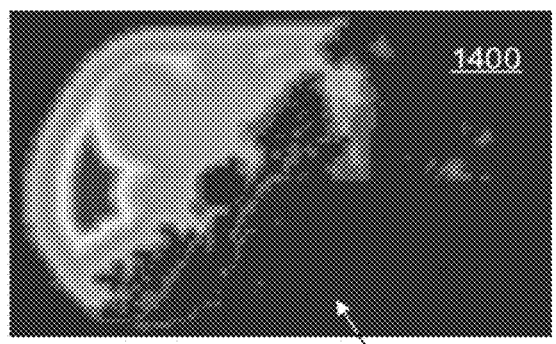
FIG. 14 displays a distance map based on the thresholded image data of FIG. 13, in accordance with an embodiment of the disclosed subject matter.

FIG. 14 displays an example of a three-dimensional distance map 1400 on the thresholded image data 1302 of FIG. 13, in accordance with an embodiment of the disclosed subject matter. The regions indicated by direction arrow 1402 and falling within the contour represented by the white areas 1302 represented in FIG. 13 are assigned distances, with the largest distance values being assigned to quanta of data, such as voxels or pixels, which are descriptive of data elements representing liver parenchyma. In turn, the distance values are matched with the highest values of the probability map which was determined in the block 430 of the flowchart 400 of FIG. 4.

In one embodiment, registration is accomplished using conventional multidimensional similarity transformation. In one embodiment, improvement or optimization of the registration is performed by minimizing the square of the difference between the model and the calculated distance map. Control then passes to a block 1125.

In the block 1125, the process 1100 locates a core region of the organ being studied within the measured data. An example of such a core region is illustrated by FIG. 15 below.

Figure 15:
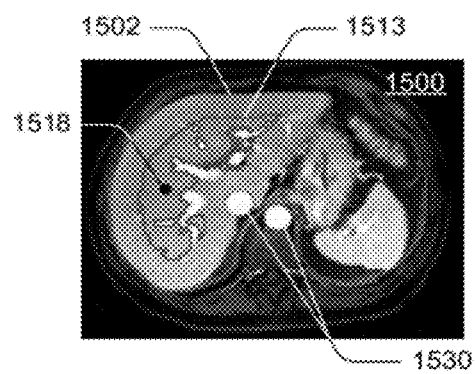
FIG. 15 shows an image of a core region of a liver representation, determined as described above with reference to the process exemplified by the flowchart of FIG. 11 in § IV, in accordance with an embodiment of the disclosed subject matter.

FIG. 15 shows an image 1500 that includes data elements representing an organ 1502 (a liver, in this example), and a boundary 1513 surrounding or circumscribing a core region 1518 of the liver representation 1502. Vessels 1530 appear as very bright spots in the image 1500. The data elements representing or included within the core region 1518, and those corresponding to the boundary 1513 thereabout, are determined as described above with reference to the block 1125 of the process 1100 exemplified by the flowchart of FIG. 11, in accordance with an embodiment of the disclosed subject matter.

The core region 1518 will be the seed region that will be used for region-growing. The thresholded image data (as represented by region 1302 in FIG. 13) is eroded to delete small regions. When the organ under study is a liver, as in this example, and because the liver has the largest volume of the abdominal organs, a sphere with relatively large radius can be used for erosion. After eroding the voxel data, the largest connected region is selected as the seed region 1518 for the segmentation.

This region 1518 contains a reliable set of liver voxels, and excludes some voxels representing liver tissue, and also excludes all voxels corresponding to any other features, such as tumors, vasculature, etc. Voxels in this core region 1518 are then used to determine intensity statistics $L_{MIN}$ and $L_{MAX}$ of organ parenchyma, without tumors or vasculature. The liver parenchyma statistics $L_{MIN}$ and $L_{MAX}$ constitute a subset of the global intensity statistics $G_{MIN}$ and $G_{MAX}$, described above with reference to FIG. 12 and text associated with description of the block 1130 of FIG. 11. In other words, $G_{MIN} \leq L_{MIN}$ and $G_{MAX} \geq L_{MAX}$.

MR images of liver tissues tend to be relatively inhomogeneous, due to characteristics of the imaging process, and as a result of lesions and artifacts. Also, some portions of liver tissue have similar intensity characteristics as neighboring organs, while other portions of liver tissue do not. In turn, these factors combine to make it difficult at best, and generally impossible, to attempt to characterize MRI data elements representing liver parenchyma via a single set of intensity statistics, while CT data representing liver tissue may be successfully characterized using a single set of intensity characteristics blanketing the entire volume of the liver, along with characteristics derived from other distinguishing features.

Consequently, segmenting different portions of the liver, such as the Couinaud portions illustrated and described at least with reference to FIGS. 8 through 10 (supra), using statistics relevant to each anatomical segment $S_i$, that is, sets of statistics $S_{MIN\_i}$ and $S_{MAX\_i}$, where i represents an index referencing one of the eight liver segments $S_i$, overcomes at least some of the problems encountered in attempting to characterize and segment MRI data representing such tissues. Each of these eight sets of statistics, $S_{MAX\_i}$ and $S_{MIN\_i}$, applies only to the indexed segment $S_i$, and each such set is computed using only voxels from the local region, which may include liver parenchyma, as well as voxels representing vessels, tumor tissues, or surrounding tissues.

As a result, the range for the statistics for each subset $S_{MAX\_i}$ and $S_{MIN\_i}$ may be narrower than the liver parenchyma intensity range bounded by $L_{MIN}$ and $L_{MAX}$, or broader than the global statistical range described by $G_{MIN}$ and $G_{MAX}$, or may fall anywhere in a range that may be in a range which has a minimum that is less than either one or both of $G_{MIN}$ or $L_{MIN}$, or which may have a maximum that is greater than either one or both of $G_{MAX}$ or $L_{MAX}$, or may be distributed in any manner in a range having one of both of the extrema outside (or inside) either or both of these ranges, according to the local environment and pathology. After computation of this set $\{S_{MIN\_i}, S_{MAX\_i}\}$ of the local statistics by block 1130 in the process 1100, control passes to a block 1135.

In the block 1135, the process 1100 segments the voxel data representing the organ, using the statistics computed in the block 1130. Each voxel is investigated, whether the intensities of the neighboring voxels correspond to thresholds ($V_{MIN}$, $V_{MAX}$) or not. The thresholds $V_{MIN}$ and $V_{MAX}$ are computed as follows:

$$V_{MIN} = S_{MIN\_i} + |S_{MIN\_i} - L_{MIN}| \cdot (1.0 - p), \text{ and} \quad (Eq. 1)$$

$$V_{MAX} = S_{MAX\_i} - |S_{MAX\_i} - L_{MAX}| \cdot (1.0 - p), \quad (Eq. 2)$$

where p is the probability value that comes from the model (e.g., as described above with reference to block 430 of FIG. 4, and illustrated and described with reference to FIG. 14 and the text associated therewith, and with that described with respect to the block 1120, supra) and belongs to the voxel to be processed.

The relationship described by Eqs. 1 and 2 may make it possible to balance between local statistics (computed from each of the segments $S_i$, that is, $S_{MIN\_i}$ and $S_{MAX\_i}$) and other statistics (computed from the core liver region 1518, that is, $L_{MIN}$ and $L_{MAX}$) bounding organ core voxel intensity ranges. Greater values of "p" indicate higher or increased probability that the voxel being investigated represents liver tissue (or other organ tissue, depending on the organ being studied).

Figure 16:
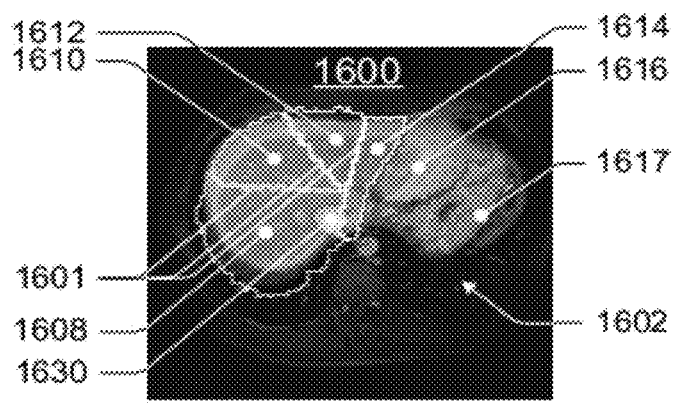
FIGS. 16 through 18 represent axial, sagittal and coronal views, respectively, corresponding to representative two-dimensional slices through the multidimensional data represented by FIG. 14 above, registered to a model developed as described with reference to § III, in accordance with an embodiment of the disclosed subject matter.
Figure 17:
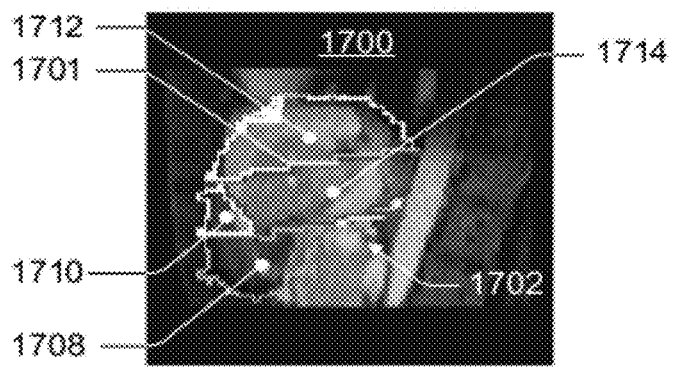
Figure 18:
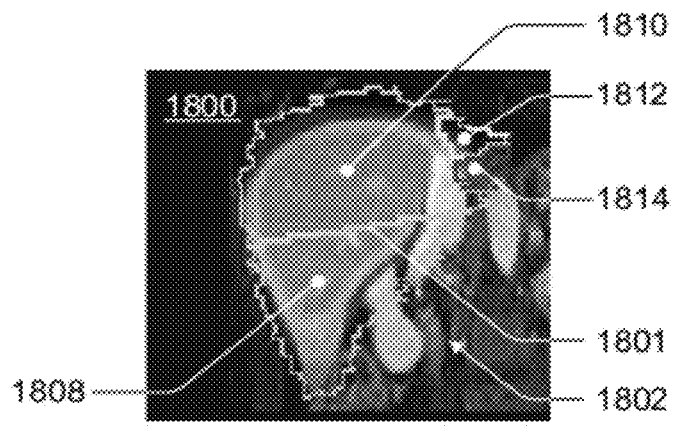

FIGS. 16 through 18 represent axial 1600, sagittal 1700 and coronal 1800 views, respectively, corresponding to representative two-dimensional slices through the multidimensional data represented by FIG. 14 above, registered to a model developed as described with reference to FIG. 4 of § III, after segmentation via the process 1100 of FIG. 11, in accordance with an embodiment of the disclosed subject matter. The perspectives 1600, 1700 and 1800 provided by FIGS. 16 through 18, respectively, provide orthogonal two-dimensional visualizations of the results of the process 1100 up to and through the acts providing results as described with reference to the block 1135.

FIG. 16 displays a view of an axial slice 1600 through the voxel data after registration to the segmented model. The axial slice image 1600 shows segmentation lines 1601 (only three of which are explicitly labeled via the reference character 1601 for simplicity of illustration and ease of understanding) which divide the organ image 1602 into five segments 1608, 1610, 1612, 1614 and 1616, illustrating portions of five of the eight Couinaud segments $S_i$ into which the organ 1602 has been segmented. An adjacent organ 1617 is explicitly excluded from the segmented voxel data, and a very bright region 1630 is shown as being within the organ 1602.

FIG. 17 provides an image showing a sagittal slice 1700 through the voxel data as registered to the segmented model. The sagittal slice image 1700 shows segmentation lines 1701 (only one of which is explicitly labeled via the reference character 1701 for simplicity of illustration and ease of understanding) which divide the organ image 1702 into four segments 1708, 1710, 1712 and 1714, illustrating portions of four of the eight Couinaud segments $S_i$ into which the organ 1702 has been segmented.

FIG. 18 provides an image showing a coronal slice 1800 through the voxel data as registered to the segmented model. The coronal slice image 1800 shows segmentation lines 1801 (only one of which is explicitly labeled via the reference character 1801 for simplicity of illustration and ease of understanding) which divide the organ image 1802 into four segments 1808, 1810, 1812 and 1814, illustrating portions of four of the eight Couinaud segments $S_i$ into which the organ 1802 has been segmented.

Control then passes to a block 1140. In the block 1140, the process 100 implements post-processing of the data. Control then passes to a block 1145. Results illustrating segmentation of organ tissue, that is, differentiation of voxels representing the organ being studied from surrounding portions of the abdomen, are illustrated and described below with reference to FIGS. 19 through 21.

Figure 19:
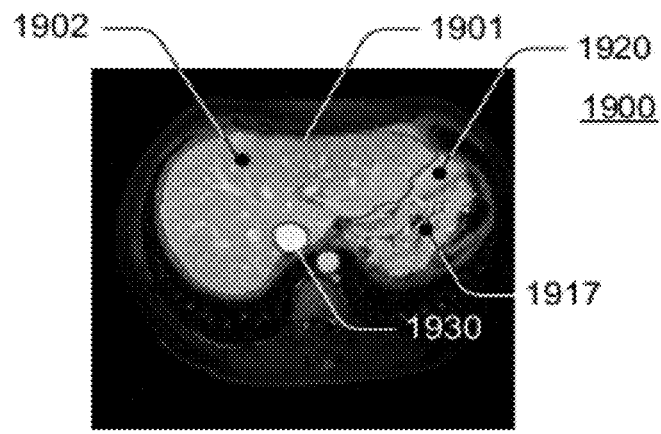
FIGS. 19 through 21 represent two-dimensional slices corresponding to axial, sagittal and coronal views, respectively, taken through a multidimensional data body representing the result of the model-based region growing algorithm of the present disclosure, in accordance with an embodiment of the disclosed subject matter.
Figure 20:
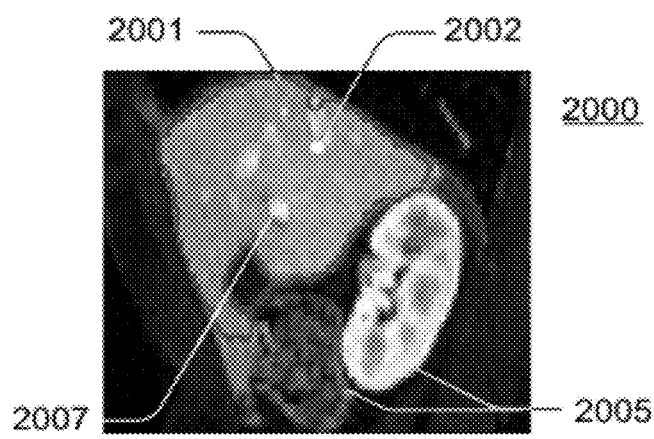
Figure 21:
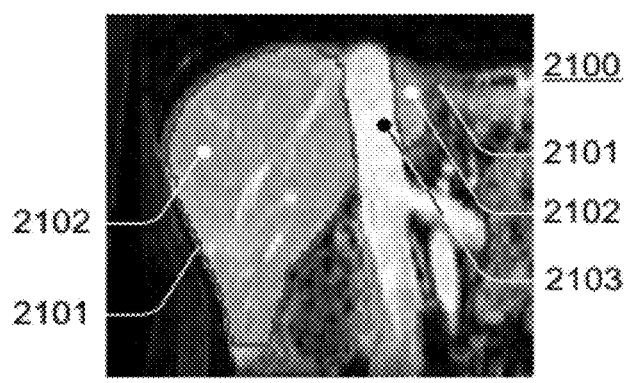

FIGS. 19 through 21 represent two-dimensional slices corresponding to axial 1900, sagittal 2000 and coronal 2100 views, respectively, taken through a multidimensional data body representing the result of the model-based region growing algorithm of the present disclosure, in accordance with an embodiment of the disclosed subject matter. These images depict a boundary 1901, 2001, 2101 surrounding an organ (a liver 1902, 2002, 2102, respectively) which has been segmented, and is distinguished from surrounding tissue, as well as from tissues extending through the organ.

FIG. 19 displays a view of an axial slice 1900 through the segmented voxel data, analogous to the axial view 1600 of FIG. 16. The axial slice image 1900 shows a segmentation boundary 1901 that distinguishes voxel data representing the organ 1902 from that of other, adjacent features, such as the organ 1917 (analogous to the organ 1617 of FIG. 16). A very small portion 1920 of the organ 1902 lies outside the boundary line 1901, but the bright feature 1930 is explicitly excluded from the voxel data describing the organ 1902 by the boundary 1901, in contrast to the analogous feature 1630 of FIG. 16.

FIG. 20 provides an image showing a sagittal slice 2000 through the segmented voxel data. The sagittal slice image 2000 shows a segmentation boundary 2001 that separates an image of the organ 2002 from other organs 2005, while including inhomogeneous data such as 2007 within the parenchyma of the segmented organ 2002.

FIG. 21 provides an image showing a coronal slice 2100 through the segmented voxel data. The coronal slice image 2100 shows segmentation boundaries 2001 which divide the organ image 2102 into two segments. More specifically, a longitudinal section 2103 in FIG. 21 (corresponding to cross-sections 1530 in FIGS. 15 and 1930 in FIG. 19), of a vessel which passes through parenchyma of the organ 2102, and which is clearly distinguished therefrom via the boundary 2101 (as is also the case with the cross-section 1930 thereof in FIG. 19).

In the block 1145, the process 1100 outputs the processed and segmented voxel data, as represented in FIGS. 19, 20 and 21, for examination via a display such as the display 142 of FIG. 1, or via hard copy from the hard copy capability 146, and which can be stored for later review etc., using a mass storage device such as the mass storage media 154 or the removable data storage device 158 of FIG. 1, or which may be sent to another facility or system, via a data linkage such as the data linkage 152 of FIG. 1. Control then passes to a block 1150, where the process 1100 ends. It will be appreciated that the various operations (e.g., 1115, ..., 1145) may correspond to apparatus or modules which are configured to execute these operations or may be programmed as computer code modules including computer-readable instructions, which, when executed by one or more processors (e.g., 130 of FIG. 1, supra, or 2204 of FIG. 22, infra), cause the one or more processors to carry out corresponding acts.

Benefits which the approaches described in the present disclosure enjoy include robust, accurate handling of voxels representing artifacts and including voxels representing lesions within boundaries of segmented organ voxel data, where the probability of the lesion being within the organ (e.g., the liver, in the example used herein) is high. As well, the disclosed methodology eliminates large over-segmentations observed with some prior art approaches to attempting to automatically characterize or segment either CT or MRI data, but which aren't intended or able to handle data from both CT and MRI data measurement modalities.

The aspects described and disclosed herein may be implemented via processes such as those described above with reference to FIGS. 4 and 11. Processes 400 and 1100 of FIGS. 4 and 11 may be implemented via computer-readable instructions embodied as computer-readable code on a computer-readable medium (such as the memory devices 150 of FIG. 1, supra, or the removable data storage device) which, when executed by one or more processors (e.g., computer 130 and/or image processing engine 138 of FIG. 1) causes the one or more processors to implement the acts described infra with respect to processes 400 or 1100, in order to automatically segment datasets descriptive of various organs and pathologies. The datasets may comprise pixel data, voxel data or other representational forms, and may be derived from any of many different types of instruments developed for the purpose of collecting data representative of anatomical (and often internal) aspects of a patient.

The process 1100 of FIG. 11 thus provides improved, automated segmentation of datasets formed by any of several different data collection modalities, promoting robust discrimination and subsequent quantification of potential pathology from anatomical data. An example of a computer useful in implementing this type of process is described below with reference to § V.

§ V. HARDWARE AND OPERATING ENVIRONMENT

Figure 22:
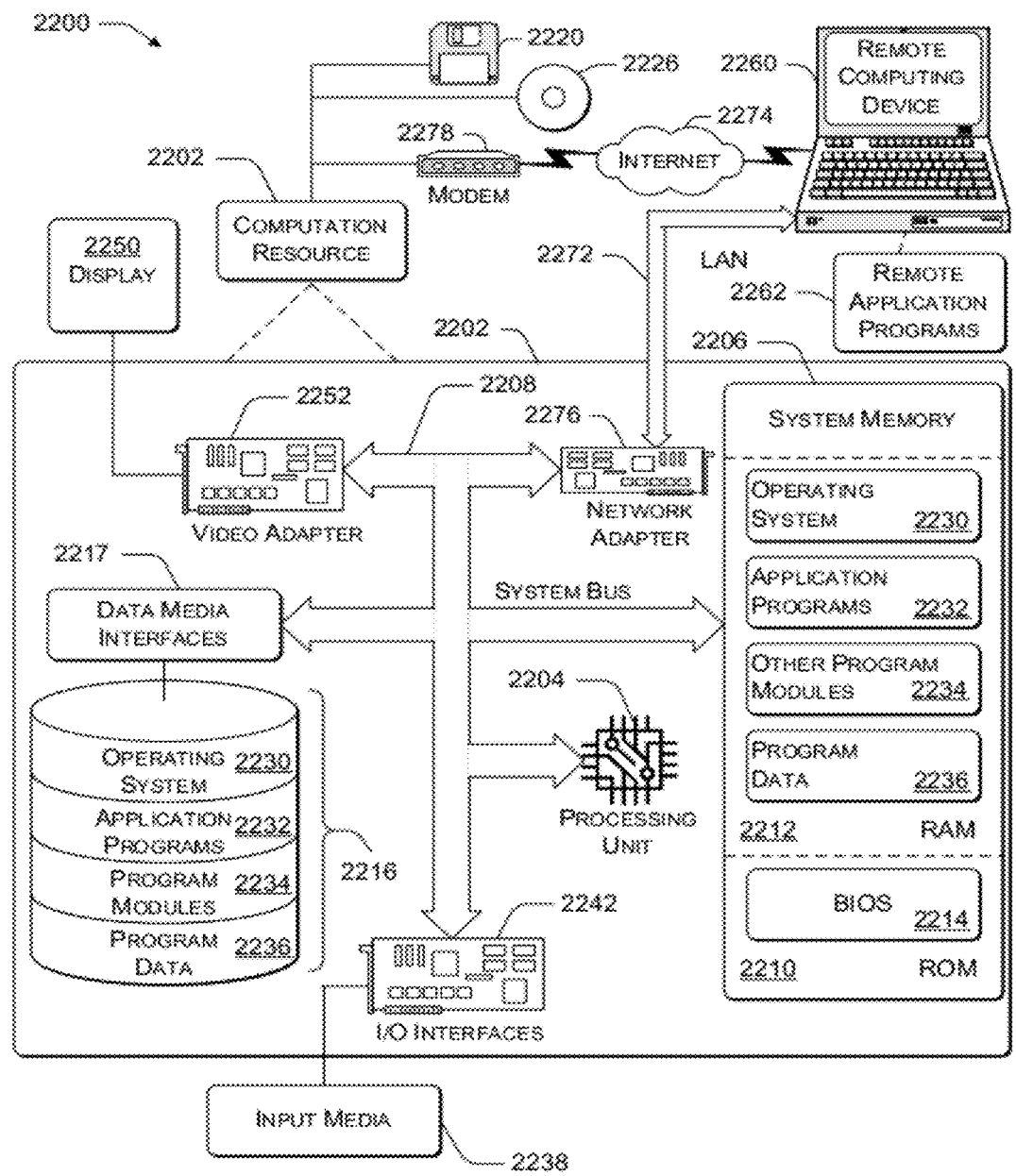
FIG. 22 illustrates an example of a general computation resource useful in the context of the environment of FIG. 1, in accordance with an embodiment of the disclosed subject matter.

FIG. 22 illustrates an example of a general computer environment 2200 useful in the context of the environment of FIG. 1, in accordance with an embodiment of the disclosed subject matter. The general computer environment 2200 includes a computation resource 2202 capable of implementing the processes described herein. It will be appreciated that other devices may alternatively used that include more components, or fewer components, than those illustrated in FIG. 22.

The illustrated operating environment 2200 is only one example of a suitable operating environment, and the example described with reference to FIG. 22 is not intended to suggest any limitation as to the scope of use or functionality of the embodiments of this disclosure. Other well-known computing systems, environments, and/or configurations may be suitable for implementation and/or application of the subject matter disclosed herein.

The computation resource 2202 includes one or more processors or processing units 2204, a system memory 2206, and a bus 2208 that couples various system components including the system memory 2206 to processor(s) 2204 and other elements in the environment 2200. The bus 2208 represents one or more of any of several types of bus structures, including a memory bus or memory controller, a peripheral bus, an accelerated graphics port and a processor or local bus using any of a variety of bus architectures, and may be compatible with SCSI (small computer system interconnect), or other conventional bus architectures and protocols.

The system memory 2206 includes nonvolatile read-only memory (ROM) 2210 and random access memory (RAM) 2212, which may or may not include volatile memory elements. A basic input/output system (BIOS) 2214, containing the elementary routines that help to transfer information between elements within computation resource 2202 and with external items, typically invoked into operating memory during start-up, is stored in ROM 2210.

The computation resource 2202 further may include a non-volatile read/write memory 2216, represented in FIG. 22 as a hard disk drive, coupled to bus 2208 via a data media interface 2217 (e.g., a SCSI, ATA, or other type of interface); a magnetic disk drive (not shown) for reading from, and/or writing to, a removable magnetic disk 2220 (analogous to the removable data storage device 158 of FIG. 1) and an optical disk drive (not shown) for reading from, and/or writing to, a removable optical disk 2226 such as a CD, DVD, or other optical media (also analogous to the removable device 158).

The non-volatile read/write memory 2216 and associated computer-readable media provide nonvolatile storage of computer-readable instructions, data structures, program modules and other data for the computation resource 2202. Although the exemplary environment 2200 is described herein as employing a non-volatile read/write memory 2216, a removable magnetic disk 2220 and a removable optical disk 2226, it will be appreciated by those skilled in the art that other types of computer-readable media which can store data that is accessible by a computer, such as magnetic cassettes, FLASH memory devices, random access memories (RAMs), read only memories (ROM), write once, read many memories (WORMs) and the like, may also be used in the exemplary operating environment.

A number of program modules may be stored via the non-volatile read/write memory 2216, magnetic disk 2220, optical disk 2226, ROM 2210, or RAM 2212, including an operating system 2230, one or more application programs 2232, other program modules 2234 and program data 2236. Examples of computer operating systems conventionally employed for processing some types of three-dimensional and/or two-dimensional medical image data include the NUCLEUS® operating system, the LINUX® operating system, and others, for example, providing capability for supporting application programs 2232 using, for example, code modules written in the C++® computer programming language.

A user may enter commands and information into computation resource 2202 through input devices such as input media 2238 (e.g., keyboard/keypad, tactile input or pointing device, mouse, foot-operated switching apparatus, aka "rat," joystick, touchscreen or touchpad, microphone, antenna etc., analogous to the user input interface 144 of FIG. 1). Such input devices 2238 are coupled to the processing unit 2204 through a conventional input/output interface 2242 that is, in turn, coupled to the system bus 2208. A monitor 2250 or other type of display device is also coupled to the system bus 2208 via an interface, such as a video adapter 2252.

The computation resource 2202 may include capability for operating in a networked environment (not illustrated) using logical connections to one or more remote computers, such as a remote computer 2260. The remote computer 2260 may be a personal computer, a server, a router, a network PC, a peer device or other common network node, and typically includes many or all of the elements described above relative to the computation resource 2202.

In a networked environment, program modules depicted relative to the computation resource 2202, or portions thereof, may be stored in a remote memory storage device such as may be associated with the remote computer 2260. By way of example, remote application programs 2262 reside on a memory device of the remote computer 2260. The logical connections represented in FIG. 22 may include interface capabilities, e.g., such as interface capabilities 152 (FIG. 1), a storage area network (SAN, not illustrated in FIG. 22), local area network (LAN) 2272 and/or a wide area network (WAN) 2274, but may also include other networks.

Such networking environments are commonplace in modern computer systems, and in association with intranets and the Internet. In certain embodiments, the computation resource 2202 executes an Internet Web browser program (which may optionally be integrated into the operating system 2230), such as the "Internet Explorer®" Web browser manufactured and distributed by the Microsoft Corporation of Redmond, Wash.

When used in a LAN-coupled environment, the computation resource 2202 communicates with or through the local area network 2272 via a network interface or adapter 2276. When used in a WAN-coupled environment, the computation resource 2202 typically includes interfaces, such as a modem 2278, or other apparatus, for establishing communications with or through the WAN 2274, such as the Internet. The modem 2278, which may be internal or external, is coupled to the system bus 2208 via a serial port interface.

In a networked environment, program modules 2262 depicted relative to the computation resource 2202, or portions thereof, may be stored in memory within the remote computing apparatus 2260. It will be appreciated that the network connections shown are exemplary, and other means of establishing one or more communications links between various computer systems and elements may be used.

A user of a computer may operate in a networked environment 100 using logical connections to one or more remote computers, such as a remote computer 2260, which may be a personal computer, a server, a router, a network PC, a peer device or other common network node. Typically, a remote computer 2260 includes many or all of the elements described above relative to the computer 2200 of FIG. 22.

The computation resource 2202 typically includes at least some form of computer-readable media. Computer-readable media may be any available media that can be accessed by the computation resource 2202. By way of example, and not limitation, computer-readable media may comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 2202.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

The computer 2202 may function as one or more of the control segments of module 120 (FIG. 1), the computer 130, the operator console 140 and/or the data acquisition and conditioning module 160, for example, via implementation of the processes 400 and 1100 of FIGS. 4 and 11, respectively, as one or more computer program modules, to advantageously provide substantial benefits as disclosed herein. A conclusion that summarizes some of those features and advantages is presented below in § VI.

§ VI. CONCLUSION

The disclosed examples combine a number of useful features and present advantages in modern hospital settings. These examples address, among other things, a key problem with segmenting and quantifying lesions, and particularly liver lesions, due to a lack of repeatability and difference between different data measurement modalities. The difficulty in processing data from different measurement techniques results from a number of causes, such a differences in contrast ratios obtained with different measurement methods, and also including various inconsistencies in the contrast uptakes of the lesions due to variations in timing between contrast agent injection and/or variations in timing of the phases, and the imaging. The combination of the robust models together with differentiation of different anatomically significant portions in order to apply locally-derived statistics to the data representing those respective segments, which are taught by the present disclosure, provides robust and accurate quantification and segmentation of organ tissues, including instances where large lesions and other idiosyncratic aspects make conventional analysis unsatisfactory or unusable. In turn, this tends to improve consistent segmentation and quantification that can be relied on for growth/change analysis, surgical planning, radiotherapy planning and other purposes.

Additionally, compatibility with existing tools and modes for image data representation, and with conventional image data storage and exchange standards facilitate interoperability with existing or extant modules previously developed for those purposes, as well as promoting compatibility with newer approaches, such as integrated surgical navigation. The disclosed capabilities also benefit from compatibility with existing systems, and thus coordinate with other, prior operator training, reducing probability of error, such as may occur in time-critical scenarios.

Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A system for analyzing multidimensional data, the data characterizing a least a portion of a subject, said system comprising:
   a processor configured to:
   accept a dataset comprising at least one multidimensional dataset, where the dataset is derived from any of several types of data sources;
   register the dataset to a selected anatomical model to provide a registered dataset;
   process the registered dataset to determine a core region within an organ of interest;
   compute associated core region statistical information;
   calculate statistical characteristics of the registered dataset using the core region statistical information and the registered dataset; and
   segment the registered dataset using the core region statistical information to provide a segmented description of the organ of interest from the registered dataset and core region statistical information, the segmented, registered dataset describing characteristics of the organ of the subject.

2. The system of claim 1, wherein the organ is a liver of the subject.

3. The system of claim 1, wherein the input dataset is voxel data, and the data source is chosen from a group consisting of: a computerized tomography system, a magnetic resonance imaging system, an ultrasound imaging system or an x-ray angiography system.

4. The system of claim 1, wherein the input dataset is voxel data from a computerized tomography system, and wherein the model is a model of human liver.

5. The system of claim 1, wherein the input dataset is voxel data from a magnetic resonance imaging system and wherein the organ data describe an organ having parenchyma presenting relatively uniform intensity data, where the organ is embedded in tissue presenting similarly relatively uniform intensity data.

6. The system of claim 1, wherein the model is selected from a library of organ models.

7. The system of claim 1, wherein the model was previously constructed using measured data from measurements of multiple subjects, by performing acts of:
   assessing each measured dataset to determine an organ volume for each dataset;
   normalizing the assessed organ volumes, where voxel data for each of the organ volumes is transformed to achieve a normalized voxel representation having uniform voxel spacing;
   selecting an average organ volume as a reference organ volume;
   registering each of the normalized voxel representations to the reference organ volume to provide registered voxel data;
   summing the registered voxel data to provide a sum voxel dataset; and
   normalizing the sum voxel dataset to provide a probability map which is included in the model corresponding to that type of organ.

8. A method for generating a model of an organ, said method comprising:
   assessing each of a plurality of measured datasets to determine an organ volume for each dataset;
   dividing a model of the organ into a plurality of anatomical regions;
   normalizing the assessed organ volumes, where voxel data for each of the organ volumes is transformed to achieve a normalized voxel representation having uniform voxel spacing;
   selecting an average organ volume as a reference organ volume;
   registering each of the normalized voxel representations to the reference organ volume to provide registered voxel data;
   summing the registered voxel data to provide a sum voxel dataset;
   normalizing the sum voxel dataset to provide a probability map which is included in the model corresponding to that type of organ;
   segmenting the normalized sum voxel dataset into a plurality of anatomical regions, each of the plurality of anatomical regions corresponding to anatomical features having significance for a medical purpose;
   associating each of the plurality of anatomical regions to a statistical data zone; and
   storing the plurality of anatomical regions forming the organ model for later usage in segmentation of measured voxel data descriptive of an organ.

9. A process, performed on a computer processor, for segmenting multidimensional data representing a measurement of an internal portion of a subject, the process including steps of:
   inputting a dataset via an input module, the dataset comprising at least one multidimensional dataset, where the dataset is derived from any of several types of data sources;
   registering, using a registration module, at least a portion of data of the dataset from the input module to a selected anatomical model to provide a registered dataset, the registration module being coupled to the input module;
   processing the registered dataset and determining a core region within the registered dataset;

computing associated core region statistical information;

calculating statistical characteristics of the registered dataset using the core region statistical information and the registered dataset; and segmenting the registered dataset using the core region statistical information to provide a segmented description of an organ from the registered dataset and core region statistical information, the segmented, registered dataset describing characteristics of the organ of the subject.

10. The process of claim 9, wherein the act of registering includes:

determining a set of global intensity statistics $\{G\}$ having a lower bound $G_{MIN}$ and an upper bound $G_{MAX}$ that include statistics applicable to voxels representing organ data and includes voxels representing vasculature, tumor tissue or tissues from outside the organ;

thresholding the registered dataset to select a set of voxels $\{V\}$ falling within the set of global intensity statistics $(G_{MIN}, G_{MAX})$;

creating a three-dimensional distance map corresponding to the set $\{V\}$;

using similarity transformation, correlating the image voxel data from the set of voxels $\{V\}$ to the organ model voxels; and minimizing a sum of squares of differences between the organ model and the distance map to provide a registered dataset.

11. The process of claim 9, wherein the act of computing includes an act of:

computing a set of core statistics $\{L\}$ having a lower bound $L_{MIN}$ and an upper bound $L_{MAX}$, using core voxels known to consist only of voxels describing organ tissue and excluding voxels describing vasculature and pathological features; and wherein the act of calculating includes an act of calculating a series of segment intensity statistics $\{S_i\}$, each having a lower bound $S_{MIN\_i}$ and an upper bound $S_{MAX\_i}$, for individual anatomical segments within the organ.

12. The process of claim 9, wherein the act of registering includes: determining a set of global intensity statistics $\{G\}$ having a lower bound $G_{MIN}$ and an upper bound $G_{MAX}$ that include statistics applicable to voxels representing organ data and includes voxels representing vasculature, tumor tissue or tissues from outside the organ by processing a total set of intensity statistics $\{T\}$ from greatest intensity value towards the least intensity value to locate a set of intensity statistics $\{G\}$ associated with a first local maximum having an environment $[G_{MIN}, G_{MAX}]$ which represents a number of image voxels exceeding a predetermined percentage of the total number of image voxels;

thresholding the registered dataset to select a set of voxels $\{V\}$ falling within the set of global intensity statistics bounded by $[G_{MIN}, G_{MAX}]$;

creating a three-dimensional distance map corresponding to the set $\{V\}$;

using similarity transformation, correlating the image voxel data from the set of voxels $\{V\}$ to the organ model voxels; and minimizing a sum of squares of differences between the organ model and the distance map to provide a registered dataset; and wherein the act of computing includes an act of computing a set of core statistics $\{L\}$ having a lower bound $L_{MIN}$ which is greater than $G_{MIN}$ and an upper bound $L_{MAX}$ which is less than $G_{MAX}$, using core voxels known to consist only of voxels describing organ tissue and excluding voxels describing vasculature and pathological features; and wherein the act of calculating includes an act of calculating a series of M many sets of segment intensity statistics $\{S_i\}$, each having a lower bound $S_{MIN\_i}$ and an upper bound $S_{MAX\_i}$, using intensity values from segments within the registered dataset that correspond to one of M many individual anatomical segments within the model.

13. The process of claim 9, wherein the act of registering includes: determining a set of global intensity statistics $\{G\}$ having a lower bound $G_{MIN}$ and an upper bound $G_{MAX}$ that include statistics applicable to voxels representing organ data and includes voxels representing vasculature, tumor tissue or tissues from outside the organ; and wherein the act of computing includes an act of computing a set of core statistics $\{L\}$ having a lower bound $L_{MIN}$ which is greater than $G_{MIN}$ and an upper bound $L_{MAX}$ which is less than $G_{MAX}$, using core voxels known to consist only of voxels describing organ tissue and excluding voxels describing vasculature and pathological features.

14. The process of claim 9, wherein the act of calculating includes an act of calculating a series of M many sets of segment intensity statistics $\{S_i\}$, each having a lower bound $S_{MIN\_i}$ and an upper bound $S_{MAX\_i}$, using intensity values from segments within the registered dataset that correspond to one of M many individual anatomical segments within the model.

15. A non-transitory computer-readable medium having computer-readable code embodied thereon, the computer-readable code including computer-readable instructions, which, when executed by one or more processors, causes the one or more processors to perform acts of:

inputting a dataset via an input module, the dataset comprising at least one multidimensional dataset, where the dataset is derived from any of several types of data sources;

registering at least a portion of data of the dataset from the input module to a selected anatomical model to provide a registered dataset;

processing the registered dataset and determining a core region within the registered dataset;

computing associated core region statistical information;

calculating statistical characteristics of the registered dataset using the core region statistical information and the registered dataset; and segmenting the registered dataset using the core region statistical information to provide a segmented description of an organ from the registered dataset and core region statistical information, the segmented, registered dataset describing characteristics of an organ of the subject.

16. The non-transitory computer readable medium of claim 15, wherein the computer-readable instructions that, when executed by one or more processors, causes the one or more processors to carry out an act of registering, further, when executed by one or more processors, causes the one or more processors to carry out acts of:

determining a set of global intensity statistics $\{G\}$ having a lower bound $G_{MIN}$ and an upper bound $G_{MAX}$ that include statistics applicable to voxels representing organ data and includes voxels representing vasculature, tumor tissue or tissues from outside the organ by processing a total set of intensity statistics $\{T\}$ from greatest intensity value towards a least intensity value to locate a set of intensity statistics {G} associated with a first local maximum having an environment [$G_{MIN}$, $G_{MAX}$] which represents a number of image voxels exceeding a predetermined percentage of the total number of image voxels;

thresholding the registered dataset to select a set of voxels {V} falling within the set of global intensity statistics ($G_{MIN}$, $G_{MAX}$);

creating a three-dimensional distance map corresponding to the set {V};

using similarity transformation, correlating the image voxel data from the set of voxels {V} to the organ model voxels; and minimizing a sum of squares of differences between the organ model and the distance map to provide a registered dataset.

17. The non-transitory computer readable medium of claim 15, wherein the computer-readable instructions that, when executed by one or more processors, causes the one or more processors to carry out an act of computing, further, when executed by the one or more processors, causes the one or more processors to carry out an act of computing a set of core statistics {L} having a lower bound $L_{MIN}$ and an upper bound $L_{MAX}$, using core voxels known to consist only of voxels describing organ tissue and excluding voxels describing vasculature and pathological features.

18. The non-transitory computer readable medium of claim 15, wherein the computer-readable instructions that, when executed by one or more processors, causes the one or more processors to carry out an act of calculating, further, when executed by the one or more processors, causes the one or more processors to carry out an act of calculating a series of M many sets of segment intensity statistics {$S_i$}, each having a lower bound $S_{MIN\_i}$ and an upper bound $S_{MAX\_i}$, using intensity values from segments within the registered dataset that correspond to one of M many individual anatomical segments $S_i$ within the model.

19. The non-transitory computer readable medium of claim 15, wherein the computer-readable instructions that, when executed by one or more processors, causes the one or more processors to carry out acts of: determining a set of global intensity statistics {G} having a lower bound $G_{MIN}$ and an upper bound $G_{MAX}$ that include statistics applicable to voxels representing organ data and includes voxels representing vasculature, tumor tissue or tissues from outside the organ by processing the total set of intensity statistics {T} from greatest intensity value towards a least intensity value to locate a set of intensity statistics {G} associated with a first local maximum having an environment [$G_{MIN}$, $G_{MAX}$] which represents a number of image voxels exceeding a predetermined percentage of the total number of image voxels;

thresholding the registered dataset to select a set of voxels {V} falling within the set of global intensity statistics ($G_{MIN}$, $G_{MAX}$);

creating a three-dimensional distance map corresponding to the set {V};

using similarity transformation, correlating the image voxel data from the set of voxels {V} to the organ model voxels; and minimizing a sum of squares of differences between the organ model and the distance map to provide a registered dataset; and wherein the computer-readable instructions that, when executed by the one or more processors, causes the one or more processors to carry out an act of computing includes computer-readable instructions that, when executed by the one or more processors, causes the one or more processors to carry out an act of computing a set of core statistics {L} having a lower bound $L_{MIN}$ which is greater than $G_{MIN}$ and an upper bound $L_{MAX}$ which is less than $G_{MAX}$, using core voxels known to consist only of voxels describing organ tissue and excluding voxels describing vasculature and pathological features; and wherein the computer-readable instructions that, when executed by the one or more processors, causes the one or more processors to carry out an act of calculating includes computer-readable instructions that, when executed by the one or more processors causes the one or more processors to carry out an act of calculating a series of M many sets of segment intensity statistics {$S_i$}, each having a lower bound $S_{MIN\_i}$ and an upper bound $S_{MAX\_i}$, using intensity values from segments within the registered dataset that correspond to one of M many individual anatomical segments $S_i$ within the model.

20. The non-transitory computer readable medium of claim 15, wherein the computer-readable code that, when executed by one or more processors, causes the one or more processors to carry out an act of registering further, when executed by one or more processors, causes the one or more processors to carry out acts of: determining a set of global intensity statistics {G} having a lower bound $G_{MIN}$ and an upper bound $G_{MAX}$ that include statistics applicable to voxels representing organ data and includes voxels representing vasculature, tumor tissue or tissues from outside the organ;

thresholding the registered dataset to select a set of voxels {V} falling within the set of global intensity statistics ($G_{MIN}$, $G_{MAX}$);

creating a three-dimensional distance map corresponding to the set {V};

using similarity transformation, correlating the image voxel data from the set of voxels {V} to organ model voxels; and minimizing a sum of squares of differences between the organ model and the distance map to provide a registered dataset.

* * * * *